(12) United States Patent
Clark et al.

(10) Patent No.: US 10,118,723 B2
(45) Date of Patent: Nov. 6, 2018

(54) CUSTOM CONTAINERS IN A MATERIALS HANDLING FACILITY

(75) Inventors: David Henry Clark, Bellevue, WA (US); Dean Christopher Fullerton, Issaquah, WA (US); Patricia T. Shigihara, Edmonds, WA (US); Kevin R. Vliet, Seattle, WA (US); Jon S. Battles, Medina, WA (US); Brian C. Smith, Seattle, WA (US); Sebastian Lehmann, Seattle, WA (US); Jaffin James, Allentown, PA (US); Lakshmi S. Nidamarthi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 703 days.

(21) Appl. No.: 13/429,257

(22) Filed: Mar. 23, 2012

(65) Prior Publication Data

US 2013/0247519 A1    Sep. 26, 2013

(51) Int. Cl.
*B65B 59/00* (2006.01)
*B65B 5/00* (2006.01)
(Continued)

(52) U.S. Cl.
CPC .............. *B65B 59/00* (2013.01); *B65B 5/00* (2013.01); *B65B 57/00* (2013.01);
(Continued)

(58) Field of Classification Search
CPC ........... B65B 59/00; B65B 5/00; B65B 57/00; B65B 2210/04; Y02P 90/30; G06Q 10/083; G06Q 50/04
(Continued)

(56) References Cited

U.S. PATENT DOCUMENTS 3,872,644 A * 3/1975 Giraudi ................. B65B 57/14
                                                              53/168
4,354,786 A   10/1982 Spitler
(Continued)

FOREIGN PATENT DOCUMENTS

CN      103210370 B    2/2017
EP        0389985 A2  10/1990
(Continued)

OTHER PUBLICATIONS

"Container packing", published by Hapag-Lloyd, in 2010, all pages (Year: 2010).*
(Continued)

*Primary Examiner* — Kevin H Flynn
*Assistant Examiner* — Omar Zeroual
(74) *Attorney, Agent, or Firm* — Athorus, PLLC

(57) ABSTRACT

Described herein are systems and techniques for determining a pack station for storing inventory in a materials handling facility, routing item packages to pack stations based on size ranges for custom containers and optimizing dimensions of custom containers based on dimensions of a shipping container. For example, the systems described herein may allocate a percentage of inventory to a custom inventory location that is physically near custom container forming devices, thereby reducing the cost to pick, sort, pack and route items for shipment, storing or otherwise handling in a custom container.

16 Claims, 10 Drawing Sheets

(51) Int. Cl.
  *G06Q 10/08* (2012.01)
  *G06Q 50/04* (2012.01)
  *B65B 57/00* (2006.01)

(52) U.S. Cl.
  CPC ........ *B65B 2210/04* (2013.01); *G06Q 10/083* (2013.01); *G06Q 50/04* (2013.01); *Y02P 90/30* (2015.11)

(58) Field of Classification Search
  USPC ........................................................ 705/330
  See application file for complete search history.

(56) References Cited

U.S. PATENT DOCUMENTS

| | | | |
|---|---|---|---|
| 5,175,692 A | 12/1992 | Mazouz et al. | |
| 5,299,410 A * | 4/1994 | Freeman | B65B 59/02 53/442 |
| 5,406,770 A * | 4/1995 | Fikacek | B65B 5/105 53/155 |
| 5,430,831 A * | 7/1995 | Snellen | G06Q 10/043 700/217 |
| 5,487,276 A * | 1/1996 | Namisniak | G09F 7/04 116/308 |
| 5,566,526 A * | 10/1996 | Suga | B65B 9/067 53/389.4 |
| 5,567,113 A | 10/1996 | Mumper | |
| 5,671,593 A * | 9/1997 | Ginestra | B65B 59/00 53/168 |
| 5,934,413 A * | 8/1999 | Konig | B65G 1/04 186/56 |
| 5,991,041 A * | 11/1999 | Woodworth | G01B 11/04 356/602 |
| 6,138,371 A * | 10/2000 | Lippa | G07B 17/00661 33/1 V |
| 6,140,922 A * | 10/2000 | Kakou | G06Q 30/02 235/385 |
| 6,148,291 A * | 11/2000 | Radican | G06Q 10/08 705/22 |
| 6,257,826 B1 | 7/2001 | Neagle et al. | |
| 6,349,526 B1 * | 2/2002 | Newman | B07C 5/10 53/143 |
| 6,366,890 B1 * | 4/2002 | Usrey | G06Q 10/087 705/28 |
| 6,374,580 B1 * | 4/2002 | Kujubu | B65B 31/022 53/376.2 |
| 6,505,094 B2 * | 1/2003 | Pape | G06Q 10/08 700/216 |
| 6,615,104 B2 | 9/2003 | England et al. | |
| 6,622,127 B1 * | 9/2003 | Klots | G06F 17/30902 705/22 |
| 6,721,762 B1 * | 4/2004 | Levine | G06Q 10/04 |
| 6,889,893 B2 | 5/2005 | Kent | |
| 6,932,751 B1 * | 8/2005 | Ward | B29C 66/841 493/187 |
| 6,938,397 B2 * | 9/2005 | Miller | B65B 11/18 53/218 |
| 6,996,948 B2 * | 2/2006 | Koke | B65B 25/065 53/459 |
| 7,054,704 B2 * | 5/2006 | Bickley | G05B 19/4183 700/100 |
| 7,085,677 B1 * | 8/2006 | Champlin | G06Q 10/087 702/174 |
| 7,210,894 B2 | 5/2007 | Huang et al. | |
| 7,263,815 B2 * | 9/2007 | Ballestrazzi | B65B 9/067 53/450 |
| 7,647,752 B2 | 1/2010 | Magnell | |
| 7,686,167 B1 | 3/2010 | Stahl | |
| 7,686,171 B1 | 3/2010 | Shakes et al. | |
| 7,695,235 B1 | 4/2010 | Rallis | |
| 7,747,543 B1 | 6/2010 | Braumoeller et al. | |
| 7,751,928 B1 | 7/2010 | Antony et al. | |
| 7,873,549 B1 * | 1/2011 | Mishra | G06Q 10/087 705/28 |
| 7,979,359 B1 | 7/2011 | Young et al. | |
| 8,028,501 B2 | 10/2011 | Buckley et al. | |
| 8,086,344 B1 * | 12/2011 | Mishra | G06Q 30/0283 700/214 |
| 8,326,679 B1 | 12/2012 | Rowe et al. | |
| 8,340,812 B1 | 12/2012 | Tian et al. | |
| 8,401,975 B1 * | 3/2013 | Tian | G06Q 10/08 705/330 |
| 8,438,052 B1 * | 5/2013 | Chanda | G06Q 30/0282 705/7.11 |
| 8,498,888 B1 | 7/2013 | Raff et al. | |
| 8,560,406 B1 * | 10/2013 | Antony | G06Q 10/08 705/28 |
| 8,600,913 B2 | 12/2013 | Williams et al. | |
| 8,676,669 B1 * | 3/2014 | Chittoor | G06Q 30/0633 705/27.1 |
| 8,787,707 B1 * | 7/2014 | Steves | G06Q 30/02 382/181 |
| 8,844,721 B2 | 9/2014 | Archambault | |
| 8,849,724 B2 * | 9/2014 | May | G06Q 10/00 705/330 |
| 9,174,758 B1 * | 11/2015 | Rowley | B65B 59/00 |
| 9,230,233 B1 | 1/2016 | Sundaresan et al. | |
| 2002/0147630 A1 * | 10/2002 | Rose | G06Q 10/0635 705/7.31 |
| 2002/0174087 A1 * | 11/2002 | Hao | G06F 17/30572 |
| 2003/0035138 A1 | 2/2003 | Schilling | |
| 2003/0126030 A1 * | 7/2003 | Hungerford, III | G06Q 10/08 186/52 |
| 2003/0146272 A1 | 8/2003 | Kent | |
| 2003/0200111 A1 * | 10/2003 | Damji | G06Q 10/08 705/335 |
| 2004/0024730 A1 * | 2/2004 | Brown | G06Q 10/087 |
| 2004/0133483 A1 * | 7/2004 | Potter | G06Q 10/087 705/28 |
| 2004/0165980 A1 | 8/2004 | Huang et al. | |
| 2004/0220694 A1 | 11/2004 | Stingel et al. | |
| 2006/0257236 A1 | 11/2006 | Stingel et al. | |
| 2007/0017984 A1 * | 1/2007 | Mountz | G06Q 10/087 235/385 |
| 2007/0021863 A1 * | 1/2007 | Mountz | G06Q 10/087 700/214 |
| 2007/0112460 A1 | 5/2007 | Kiselik | |
| 2007/0136150 A1 | 6/2007 | Biancavilla et al. | |
| 2008/0020916 A1 * | 1/2008 | Magnell | B65B 5/02 493/65 |
| 2008/0046116 A1 | 2/2008 | Khan et al. | |
| 2008/0167884 A1 | 7/2008 | Mountz et al. | |
| 2009/0000912 A1 * | 1/2009 | Battles | B65G 1/1371 198/431 |
| 2009/0277139 A1 * | 11/2009 | Eckel | B65B 55/20 53/474 |
| 2010/0017296 A1 * | 1/2010 | Spignesi, Jr. | G06F 19/3462 705/14.66 |
| 2010/0030354 A1 | 2/2010 | Wiesel | |
| 2010/0049537 A1 * | 2/2010 | Erie | B65B 5/00 705/1.1 |
| 2010/0089781 A1 | 4/2010 | Uum et al. | |
| 2010/0106295 A1 | 4/2010 | Cho et al. | |
| 2010/0108544 A1 | 5/2010 | Biundo | |
| 2010/0121777 A1 * | 5/2010 | McGonigal | G06F 17/30867 705/347 |
| 2010/0131420 A1 | 5/2010 | Williams et al. | |
| 2010/0221094 A1 | 9/2010 | Kuehnemann et al. | |
| 2010/0222915 A1 | 9/2010 | Kuehnemann et al. | |
| 2010/0293896 A1 * | 11/2010 | Buckley | G06Q 10/083 53/456 |
| 2011/0031152 A1 | 2/2011 | Petlak et al. | |
| 2011/0082734 A1 * | 4/2011 | Zhang | G06Q 10/087 705/14.23 |
| 2011/0103924 A1 * | 5/2011 | Watt | B65G 49/00 414/331.13 |
| 2011/0106295 A1 | 5/2011 | Miranda et al. | |
| 2011/0270439 A1 | 11/2011 | Gomez et al. | |

(56) References Cited

U.S. PATENT DOCUMENTS

| | | | |
|---|---|---|---|
| 2011/0295413 A1* | 12/2011 | Hara | G06Q 10/087 700/216 |
| 2012/0002446 A1 | 1/2012 | Madawala | |
| 2012/0233039 A1* | 9/2012 | Buonagurio | G06Q 10/087 705/28 |
| 2012/0259687 A1* | 10/2012 | Kajamohideen | G06Q 30/0601 705/14.23 |
| 2012/0305435 A1 | 12/2012 | Matta et al. | |
| 2013/0015240 A1 | 1/2013 | Chen et al. | |
| 2013/0197875 A1 | 8/2013 | Shirley et al. | |
| 2013/0218799 A1* | 8/2013 | Lehmann | G06Q 10/063 705/337 |
| 2013/0232921 A1* | 9/2013 | Sankaran | B65B 5/045 53/473 |
| 2013/0247519 A1 | 9/2013 | Clark et al. | |
| 2014/0067104 A1* | 3/2014 | Osterhout | G06Q 50/28 700/97 |
| 2015/0005926 A1* | 1/2015 | Pettersson | B65B 59/00 700/228 |

FOREIGN PATENT DOCUMENTS

| | | |
|---|---|---|
| EP | 2136330 A1 | 12/2009 |
| JP | H10045220 | 2/1998 |
| JP | 2000351422 A | 12/2000 |
| JP | 2005255390 A | 9/2005 |
| JP | 2006048414 A | 2/2006 |
| JP | 2007017611 A | 1/2007 |
| JP | 2013539103 A | 10/2013 |
| WO | 1996038708 A1 | 12/1996 |
| WO | 2003090149 A1 | 10/2003 |
| WO | 2011072253 A1 | 6/2011 |
| WO | 2012018859 A1 | 2/2012 |
| WO | 2013142106 A1 | 9/2013 |
| WO | 2013122999 | 10/2014 |

OTHER PUBLICATIONS

PCT International Search Report & Written Opinion for Application No. PCT/US2013/030086 (corresponding to U.S. Appl. No. 13/429,257), dated May 23, 2013, 7 pages.

PCT International Search Report & Written Opinion for Application No. PCT/US2013/025865 (corresponding to U.S. Appl. No. 13/398,602), dated Apr. 23, 2013, 6 pages.

Jackie Roembke, "From the Last Step Forward: GAR Products Takes its First Step by Revamping its Packaging Operations," "Wood Digesgt," Nov. 2007, pp. 26-29, vol. 38, No. 11.

Jon E. Hilsenrath, "Beijiing Strikes Gold with U.S. Recycling," "The Asian Wall Street Journal," Apr. 9, 2003, Publisher: Dow Jones & Company Inc.

Chinese Office Action for Application No. 201380015901 dated Mar. 2, 2016.

EP Search Report for EP Application No. 13749116.3 dated Aug. 27, 2015.

EP Search Report for EP Application No. 13763548 dated Nov. 30, 2015.

Hapag-Lloyd, "Container Packing", 2010.

International Search Report and Written Opinion for PCT Application No. PCT/US13/30086 dated May 23, 2013.

McDermott, John F., Making a Manual Cost System Work for You: The First Step is to Put in Place a Formal Structure for Monitoring Costs, Dec. 1982, p. 40, vol. 64, No. 6, Publisher: Management Accounting.

Extended European Search Report for EP Patent Application No. 17153078.5 dated May 4, 2017.

Japanese Office Action for Japanese Patent Application No. 2016-049100 dated Mar. 21, 2017.

Japanese Office Action for Japanese Patent Application No. 2016-075830 dated Apr. 5, 2017.

Second Chinese Office Action for Chinese Application No. 201380009597.X dated Mar. 21, 2017.

* cited by examiner

CUSTOM CONTAINERS IN A MATERIALS HANDLING FACILITY

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by clients or customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

Common concerns with fulfilling items and/or groups of items involves optimizing the picking of items from a materials handling facility and ensuring that appropriate containers are used for shipping those items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

Figure 1:
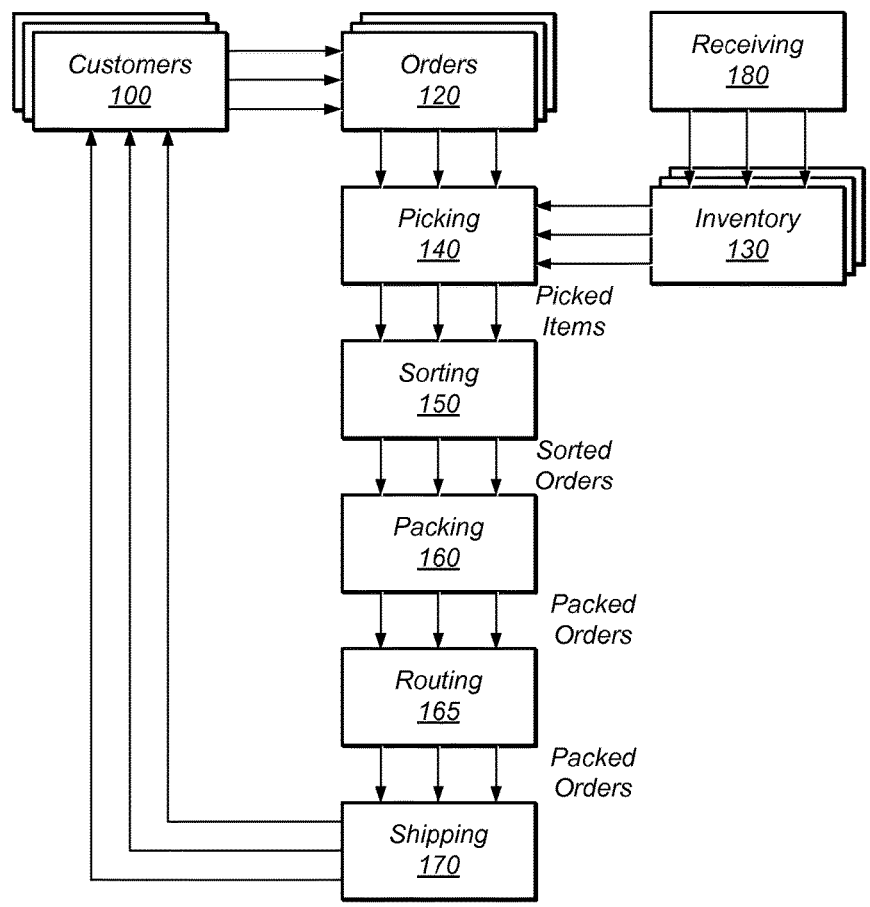
FIG. 1 illustrates a broad view of the operation of a materials handling facility, in one implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

A packaging information system configured to facilitate stowing, picking, packing and/or shipping operations may include various components used to facilitate efficient and/or cost-effective operations in a materials handling facility. For example, in various embodiments, a packaging information system may include an inventory management system, a planning service, a product dimension estimator, a product dimension correction manager, a container recommendation service, one or more custom container forming devices (CCFD), a package performance analyzer, and/or a packaging service which may be utilized together or separately to facilitate efficient and/or cost-effective operations in the materials handling facility. For example, one or more of these components may be utilized to recommend a standard container or a custom container that is suitable for shipping, storing or transporting one or more items from or within the materials handling facility dependent on physical characteristics of the one or more items, such as physical dimension values, and estimated fulfillment costs for the item or group of items. A "standard container," as used herein is any pre-formed container having standard, pre-defined dimensions. A "custom container," as used herein, is any container that is formed within a materials handling facility according to physical characteristics (e.g., length, width, height) associated with one or more items to be placed in the container. For example, the physical characteristics may be dimension values (e.g., length, width, height) associated with an item that is to be placed in the custom container for shipping and the custom container may be formed based on those provided dimension values, referred to herein as "custom container dimension values." In some examples, a custom container may be formed using an EM6 or EM7-25 packaging machine available from Packsize® International LLC, a Box on Demand™ packaging machine, or manually formed by cutting a custom container from one or more blanks of corrugate, in response to receiving custom container dimension values from the container recommendation service as part of a packing, storing or shipping operation.

In some embodiments, a custom container may be selected to reduce the transportation costs associated with shipping an item or group of items to a customer. For example, if a customer orders an item that is to be shipped to their home address in Seattle, Wash. from a materials handling facility located in Lexington, Va., the packaging information system may identify and recommend a standard container available at that materials handling facility within which the item may be shipped to the customer and also determine custom container dimension values for a custom container that can be formed in that materials handling facility and used to ship the item to the customer. For each (standard container and custom container) a total shipment cost can be estimated that includes, for example, transportation costs, labor costs and packaging materials costs.

By estimating the total shipment cost for each of a recommended standard container and a custom container, the packaging information system can determine the lowest total cost combination to deliver the item to the customer.

Continuing with the above example, if the item to be shipped has dimensions of 30 in.×20 in.×15.5 in., the packaging information system may select a standard container available at the materials handling facility that has dimensions of 35 in.×25 in.×20 in.—representing the smallest available standard container in the materials handling facility in Lexington that is still large enough to handle the item to be shipped. In addition, the packaging information system may determine that a custom container having custom container dimensions of 30.2 in.×20.2 in.×15.7 in. can be formed using a custom container forming device in the materials handling facility for use in shipping the item to the customer.

Based on those two options, the system may determine that the transportation cost for the standard container, referred to herein as standard container transportation cost, is $7.50 and the transportation cost for the custom container, referred to herein as custom container transportation cost, is $6.25. This could be based on the volume of the respective containers, the total weight (e.g., the weight of the custom container may be less because less corrugate is used), or some other factor for determining transportation costs. Provided that the other costs (e.g., overhead, materials, labor, machine) associated with utilizing the custom container do not exceed $1.25, the packaging information system may recommend that the item be shipped in the custom container and route the item to a packing station with a custom container forming device capable of forming a custom container having the recommended custom container dimension values. As discussed further below, in alternative examples, the item may be routed to any packing station, the custom container formed by a custom container forming device located anywhere within the materials handling facility and routed to the same packing station and the items then packed in the formed custom container. Regardless, for this example, utilizing the custom container lowers the total fulfillment cost for the item, thereby increasing the overall profit margin of the materials handling facility.

In some embodiments, a container recommendation may also be dependent on the customer to whom the item is to be shipped, an applicable service level agreement, the destination of the item, the carrier selected for transporting the item, item affinity information, an indicator of the fragility of the item, the weight of the item, and/or an environmental constraint associated with the item (e.g., a restriction on the temperature and/or humidity at which the item should be held during transport). In addition, a container recommendation may also be based on ensuring a good customer experience. For example, a custom container may be selected, even if more costly, so that the item contained in the container fits well and the customer does not receive a container that is unnecessarily large, and filled with a large amount of dunnage.

As used herein, the term "item package" may refer to a single item to be stored, shipped, or otherwise handled in a container, alone, or to multiple items that have been grouped for shipping, storing or for any other operation within a materials handling facility, such as for storing in inventory or transporting to a packing or shipping station. The term "container" may refer to any dimensionally-constrained environment, such as crates, cases, bins, boxes, mailing envelopes or folders, or any other apparatus capable of handling one or more items for storing, conveying or transporting. In some embodiments, references to a "container" may refer to any dimensionally-constrained environment, including conventional containers (e.g., boxes, bins, and the like), portals (doorways, hatches, etc.) and dimensionally-constrained paths (chutes, tracks, conveyor belts, etc.).

For illustrative purposes, some examples of a packaging information system (and/or various components thereof) are discussed below in which particular item and container parameters are analyzed in particular manners, and in which particular types of analyses and processing of parameters is performed. However, those skilled in the art will appreciate that the techniques described may be used in a wide variety of other situations, and that other implementations are not limited to the details of these examples.

A block diagram of a materials handling facility, which, in one embodiment, may be an order fulfillment facility configured to utilize various systems and methods described herein, is illustrated in FIG. 1. In this example, multiple customers 100 may submit orders 120 to a distributor, where each order 120 specifies one or more items from inventory 130 to be shipped to the customer or to another entity specified in the order. An order fulfillment facility typically includes a receiving operation 180 for receiving shipments of stock from various vendors and storing the received stock in inventory 130. To fulfill the orders 120, the one or more items specified in each order may be retrieved or "picked" from inventory 130 (which may also be referred to as stock storage) in the order fulfillment facility, as indicated by block 140. In some embodiments, the items in an order may be divided into multiple item packages (i.e., shipment sets) for fulfillment by a planning service before item package fulfillment instructions are generated (not shown).

In this example, picked items may be delivered to one or more stations in the order fulfillment facility for sorting 150 into their respective orders or shipment sets and for packing. A package routing operation 165 may sort packed orders for routing to one of two or more shipping operations 170, from which they may be shipped to the customers 100. The package routing operation 165 may in various embodiments be automated or manual. The package routing operation 165 may receive an indication of the destination to which each packed order should be routed from a central control system. In some embodiments, a predictive router may determine a routing destination for each packed order dependent on the size of a container that is recommended for shipping the order and/or whether the container to be used in transporting the order is a standard container or a custom container.

The predictive router may provide an indication of the predictive routing destination to the central control system, and/or directly to the package routing operation 165, so that the packed order may be diverted to an appropriate shipping operation 170, as described herein. In other embodiments, a routing operation may route picked or sorted items to a particular packing station 160, depending on whether a standard container (e.g., a pre-formed box or mailer) or a custom container has been recommended for containing the item or items. For example, if a custom container has been recommended for containing one or more items, a routing operation may route picked or sorted items to a particular packing station 160 that includes a custom container forming device configured to form the container to match the recommended custom container dimension values. In other examples, if a custom container has been recommended for containing one or more items, a routing operation may route picked or sorted items to a particular packing station 160, instruct a custom container forming device located within the facility (either at or remote from the packing station) to form the custom container and then route the formed custom container to the packing station 160.

In other embodiments, when a standard container is selected, the routing operation may route the picked or sorted items to a particular packing station 160 depending upon the size or type of the recommended standard container. For example, not all standard containers utilized in the facility may be available at all of the packing stations 160. Similarly, some packing stations 160 may not have access to protective materials recommended for shipping fragile items or items for which additional protection may be appropriate. Therefore, if an item (or at least one item in a group of items to be shipped together) requires special packaging, a routing operation may be configured to direct the item(s) to a packing station 160 at which an appropriate container and/or protective materials are available.

Note that not every fulfillment facility may include both sorting and packing stations. In certain embodiments, agents may transfer picked items directly to a packing station, such as packing station 160, while in other embodiments, agents may transfer picked items to a combination sorting and packing stations (not illustrated). This may result in a stream and/or batches of picked items for multiple incomplete or complete orders being delivered to a sorting station for sorting 150 into their respective orders for packing and shipping, according to one embodiment.

Note that portions of an order may be received at different times, so sorting 150 and packing may have to wait for one or more items of some orders to be delivered to the sorting station(s) before completion of processing the orders. Note that a picked, packed and shipped item package does not necessarily include all of the items ordered by the customer; a shipped item package may include only a subset of the ordered items available to ship at one time from one inventory storing location. Also note that the various operations of an order fulfillment facility may be located in one building or facility, or alternatively may be spread or subdivided across two or more buildings or facilities.

A container recommendation service (which may provide standard container recommendations, custom container recommendations and/or specialty packaging recommendations), as described herein in various embodiments, may be utilized in a number of different facilities and situations, including, but not limited to, materials handling facilities, order fulfillment centers, rental centers, retailers, distribution centers, packaging facilities, shipping facilities, libraries, museums, warehouse storage facilities, and the like. Note that the arrangement and order of operations illustrated by FIG. 1 is merely one example of many possible embodiments of the operation of an order fulfillment facility utilizing a container recommendation service. Other types of materials handling, manufacturing, or order fulfillment facilities may include different, fewer, or additional operations and resources, according to different embodiments. For example, as discussed further below, in some implementations, one or more custom container forming devices may be utilized at receiving 180 such that received stock is packed in a custom container prior to placement in inventory. In such an example, rather than routing the inventory item to a packing station, the item can be picked and transferred directly to shipping because it has already been packaged at receiving 180. In yet another example, a custom container forming device may be included at picking 140 such that a custom container for an item package is formed prior to picking. In this example, the formed custom container may be used by a picking agent and the item(s) may be picked directly into the custom container, packed and shipped.

The items in a materials handling facility may be of varying shapes, sizes, and weight. For example, some items in a materials handling facility may be irregularly shaped. To facilitate container recommendation and/or more efficient shipping, irregularly shaped items may be handled in boxes or other regularly shaped packaging, which may make stacking of such items possible. In other embodiments, irregularly shaped items may be handled without placing them in regularly shaped packaging. According to various embodiments, automated product dimension estimation and/or correction may be utilized with any regularly shaped or irregularly shaped items.

Figure 2:
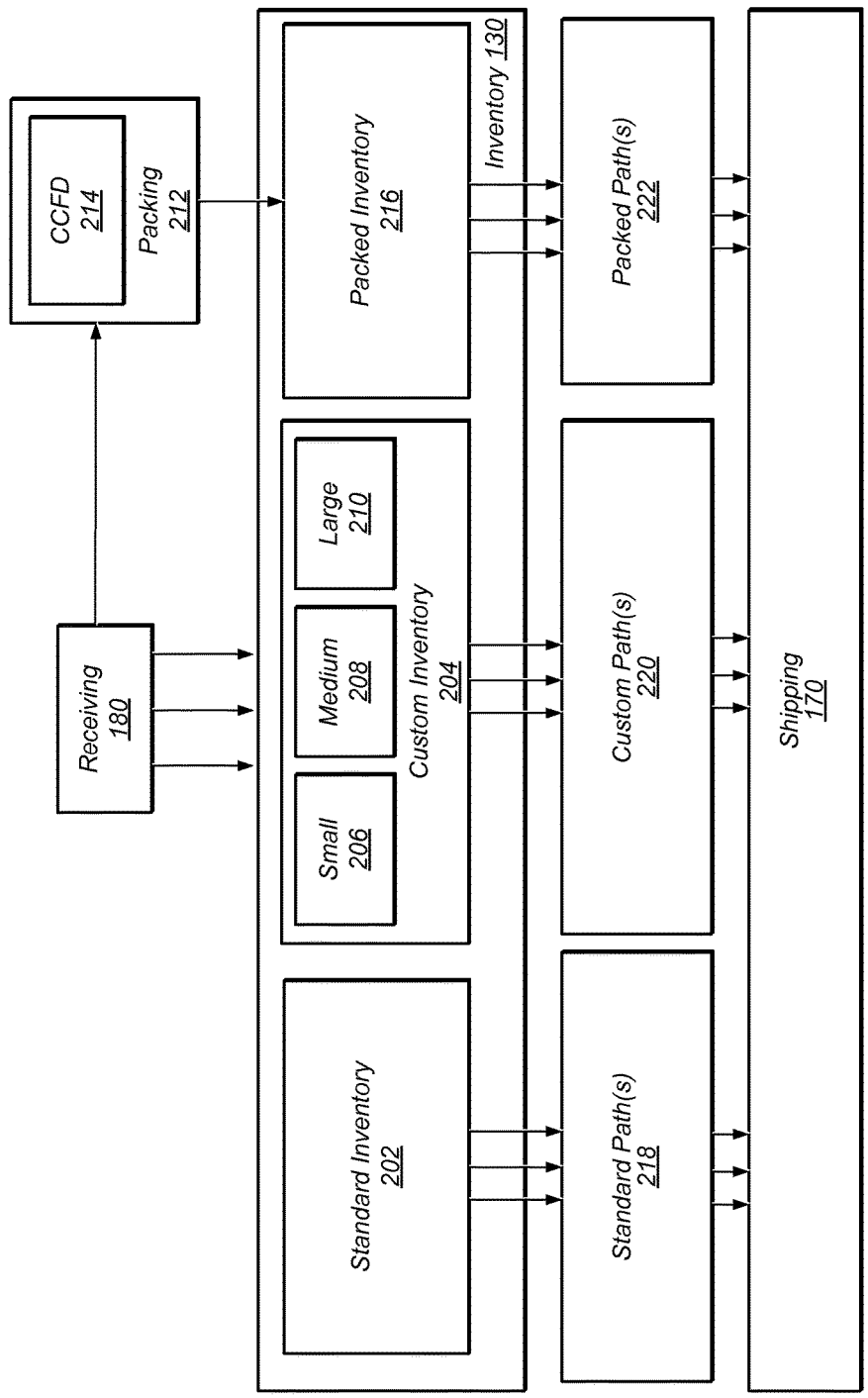
FIG. 2 illustrates an additional view of the operation of a material handling facility, in one implementation.

FIG. 2 illustrates an additional view of the operation of a material handling facility, in one implementation. As shown in FIG. 2, inventory 130 may be segmented into standard inventory 202 and custom inventory 204. In some implementations, there may be a further segmentation of inventory 130 into packed inventory 216. In this example, at receiving 180 an inventory management system may determine if a stock item is often shipped to customers in standard containers or custom containers. If a percentage of the shipments containing that item are shipped in custom containers, the inventory management system may segment the items into both standard inventory 202 and custom inventory 204. Segmenting stock into standard inventory 202 and custom inventory 204 improves picking operations to the different pack stations, as discussed below. For example, if a stock item at receiving 180 from a vendor is ultimately packed in a custom container 60% of the time, the inventory management system may allocate 60% of the received inventory for that item to custom inventory 204 and 40% to standard inventory 202. Alternatively, the inventory management system may determine the total amount of stock inventory and allocate a percentage of the received inventory so that the total stock of the inventory within the fulfillment center is distributed such that 60% is located in the custom inventory 204 and 40% is located in standard inventory 202.

In addition to allocating inventory at receive, the inventory management system may periodically rebalance inventory within the fulfillment center. For example, once per week, the inventory management system may assess the distribution of inventory between standard inventory 202 and custom inventory 204 and rebalance the inventory as needed. In one example, inventory may be rebalanced by initiating orders for agents to pick a specific amount of inventory from one inventory location and then stow that inventory in another inventory location.

Standard inventory 202 may be positioned within a materials handling facility such that it is physically close to pack stations with standard containers. Locating standard inventory 202 physically near pack stations with standard containers reduces the time and labor required for standard paths 218, which may include picking, sorting, packing, and routing for shipping 170 of items that utilize standard containers. For example, if the standard inventory 202 and pack stations with standard containers are all physically located near one another, the time and labor required to pick, sort, and pack the items may be reduced.

Likewise, placing items in custom inventory 204 that are frequently packaged in custom containers may reduce the time and labor required for custom paths 220, which may include picking, sorting, packing and routing for shipping 170 of items in custom containers. For example, positioning the custom inventory 204 physically near custom container forming devices and near pack stations reduces the time and labor required to pick and route items from custom inventory 204 to the appropriate pack station. In some implementations, the custom container forming devices may be integrated with and part of the pack stations. In other implementations, the custom container forming devices may be separate from the pack stations and formed custom containers routed from the custom container forming devices to specific pack stations so that the appropriate items can be packed in the formed custom containers.

As described further below, in some implementations, different custom container forming devices may be configured to only fabricate custom containers of particular dimensions or size ranges (e.g., small, medium, large). In such an implementation, the custom inventory 204 may be further segmented such that items within a particular size range may be stored together. For example items of different dimension ranges may be stored in small inventory 206, medium inventory 208 and large inventory 210. The small inventory 206, medium inventory 208, and large inventory 210 areas may be positioned physically near custom container forming devices configured to form custom containers having dimensions that will contain items within those ranges. For example, the small inventory 206 may be positioned physically near custom container forming devices configured to form small custom containers.

Small custom containers may be, for example, any custom container whose total height×width is less than 22 inches. Likewise, medium custom containers may be, for example, any custom container having a total height×width between 22 inches and 26 inches and large custom containers may be any custom container having a total height×width above 26 inches. In other examples, small custom containers, medium custom containers and large custom containers may be determined based on total volume of the custom containers. It will be appreciated that the size range for small custom containers, medium custom containers and large custom containers may be based on any range, size, or other dimension. It will also be appreciated that more or fewer sizes and respective inventory locations may be utilized with the implementations described herein.

In still a further example, stock items that are often ultimately contained individually in custom containers, or items having a unique shape that would store more easily in a custom container, may be routed from receiving 180 to packing 212. In this example, when the stock items are received at packing 212 item dimension values may be determined, custom containers formed to contain the items and the items packed in the formed custom containers. This may be done prior to placing the items in inventory 130 so that when placed in inventory 130, such as packed inventory 216, they are already contained in a custom container and available for shipment.

Packing 212 may include multiple custom container forming devices, each configured to form custom containers within specific ranges (small, medium, large) or may include one or more custom container forming devices capable of forming any size custom container. Items that are packed in custom containers at packing 212 prior to placement in inventory 130, such as packed inventory 216, may be processed through packed paths 222, which may only include a picking operation, and routed directly to shipping 170. In addition to eliminating the need for subsequent packing, packing prior to storage in inventory 130 can also be used to protect fragile items while in storage as well as during shipping. For example, fragile items may be packed in a custom container with additional protective material.

Items that are packed in custom containers prior to storage may subsequently be packed again inside either another custom container or a standard container. For example, if an item is routed to packing 212, placed in a custom container and stored in packed inventory 212, it may subsequently be part of a larger order of multiple items that are picked and packed together in either another custom container or in a standard container for shipping to a customer. In still another example, an item that is packed in a custom container at packing 212, rather than storing in packed inventory 216, they may be stored in custom inventory 204 and/or standard inventory 202.

Figure 3:
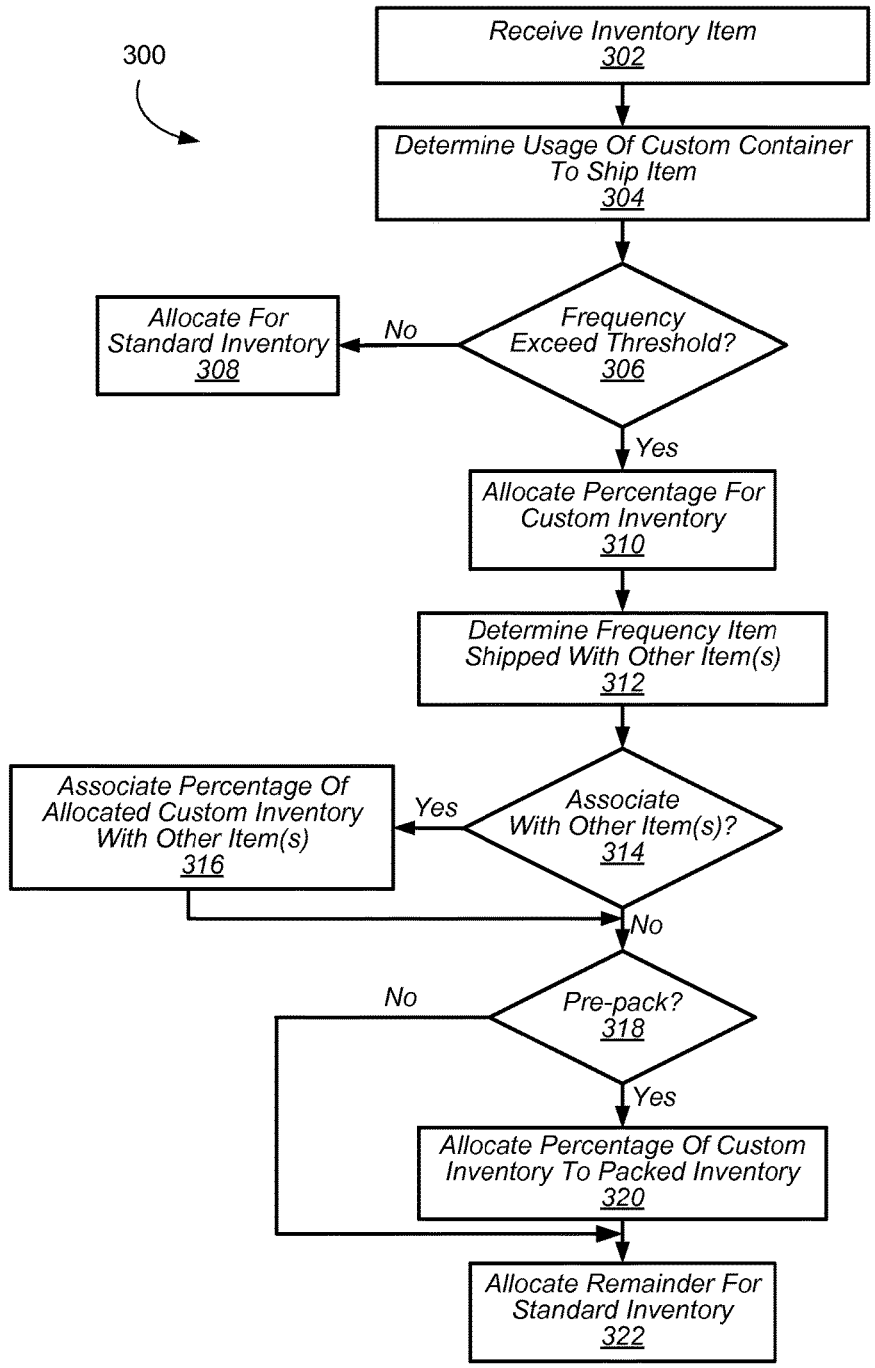
FIG. 3 is a flow diagram illustrating an example process for receiving inventory into a materials handling facility.

FIG. 3 is a flow diagram illustrating an example process for receiving inventory into a materials handling facility. Inventory items are frequently received from various sources, such as vendors, manufacturers, sellers and the like, for storage in a materials handling facility, as in 302. For example, 1,000 units of an item may be received at receiving 180 of the materials handling facility for storing in inventory 130 of the materials handling facility. Once received, it is determined how frequently those inventory items are shipped or otherwise contained in custom containers, as in 304. If the frequency with which those items are shipped or otherwise stored in custom containers exceeds a threshold, as illustrated by positive exit from 306, a percentage of the items are allocated for storage in custom inventory, as in 310. Continuing with the above example, if 60% of the time the items are shipped or otherwise stored in a custom container, 600 of the stock items may be allocated for storage in a custom container. In an alternative example, rather than allocating inventory based on the amount currently at receiving 180 (FIG. 2), received units may be allocated based on the total amount of like inventory that will be in the materials handling facility. For example, if there are 10,000 units of an item at receiving 180 (FIG. 2), 5,000 units of the same inventory item stored in standard inventory 202 and 5,000 units of the same inventory item stored in custom inventory 204, the system may allocate 7,000 of the received units to custom inventory 204 and 3,000 of the units to standard inventory 202.

The threshold value may be any value, static or dynamic. For example, the threshold value may vary depending upon the amount of space available in custom inventory. If there is limited available space in custom inventory, the threshold value may increase. Alternatively, the threshold value may vary depending upon the item under consideration. For example, if there is a large cost to move the item within the materials handling facility (e.g., it is heavy and/or large item) the threshold value may be lower than items that only incur a low cost to move within the materials handling facility. In yet another example, the threshold value may vary depending on the frequency with which the item is ordered—frequently ordered items having a lower threshold value. In other implementations, the threshold value may be a combination of any one or more of these factors. Alternatively, the threshold value may be 0 and any item that is shipped or otherwise stored in custom containers exceeds the threshold.

If the frequency with which the item is shipped or otherwise stored in a custom container does not exceed the threshold, as illustrated by negative exit at 306, the item is allocated for storage in standard inventory, as in 308.

In addition to allocating inventory between standard inventory and custom inventory, the frequency with which the item is shipped together with other items may be determined, as in 312. If the item is frequently shipped with other items, it may be stored physically near the other item(s) in either standard inventory or custom inventory (not shown). In addition, for items allocated for custom inventory, it may be determined whether to associate those items, as in 314. For example, items may be associated if they are frequently ordered and shipped together. If it is determined that items should be associated, as illustrated by positive exit from 314, a percentage of the items may be associated, as in 316. Associating items may include, storing them physically near one another, or otherwise associating the items with one another. In addition, it may be determined whether items allocated for custom inventory, either individually or associated with other items, should be pre-packed in a custom container prior to placing in custom inventory, as illustrated at 318. If it is determined that the item, or associated items should be pre-packed, a percentage of the item allocated for custom inventory is allocated to packed inventory, as in 320. The item(s) allocated for packed inventory may have their dimensions determined, a custom container formed, and placed in the custom container prior to storing in inventory (not shown). For example, if it is determined that 50% of the items that are ultimately shipped or otherwise stored in a custom container are also ordered and shipped with a second item, 300 of the 600 stock items allocated for custom inventory may be associated with the second item and allocated to packed inventory. Item package dimensions for the two items may be determined, custom containers formed and the associated items packed in the custom containers prior to storing in inventory. Similar to the above, allocation of inventory may be done based on the inventory currently at receive or based on the total amount of the same inventory within the materials handling facility.

If multiple items are associated and packed in a custom container prior to storing in inventory, the items may be treated as a single item for inventory handling. When the items are ordered a pick process may be initiated for the individual custom container that includes the multiple items. The individual custom container may be picked and routed directly to shipping, thereby reducing the time and handling cost associated with picking, sorting, packing and routing the items.

Inventory that has not been allocated to custom inventory or packed inventory is allocated for standard inventory, as in 322.

Figure 4:
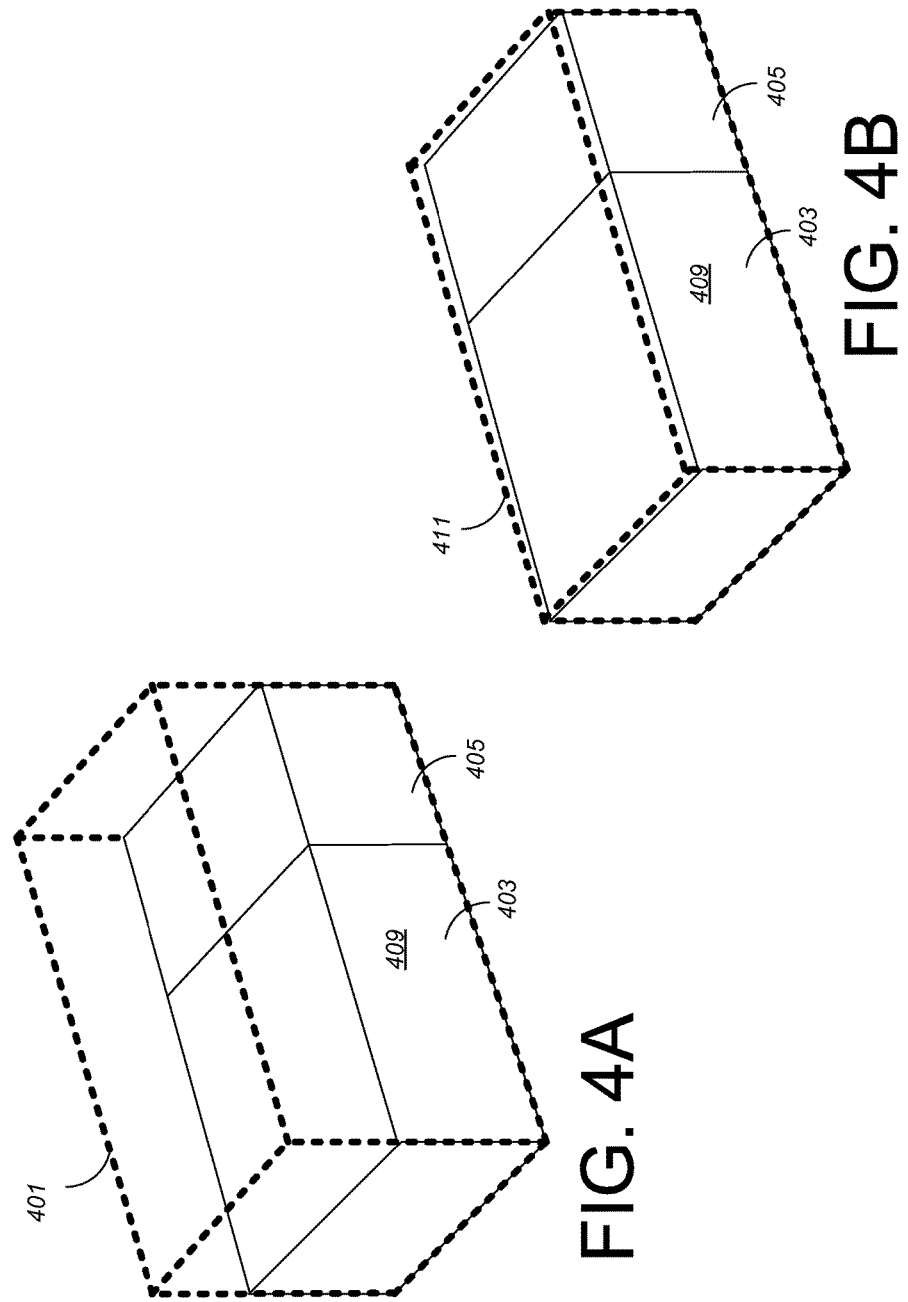
FIG. 4A is a block diagram of standard container containing items.
FIG. 4B is a block diagram of a custom container containing items.

FIGS. 4A-4B illustrate examples of a how a container recommendation service may select a standard container 401 to recommend for shipping an item package 409 of two items 403, 405 and determine custom container dimension values to recommend for forming a custom container 411 for shipping the same item package 409 of two items 403, 405 (FIG. 4B). In some embodiments, the container recommendation service may be configured to recommend various containers suitable for shipping the item package 409 dependent on item dimension values currently associated with the items 403, 405 of the item package 409 and/or dimensions associated with the item package 409 itself. For example, the container recommendation service may recommend a particular container suitable for shipping an item package 409 based on known or estimated dimension values of the items 403, 405 in the item package 409 (e.g., item dimension values provided by the vendors of each of the items, measured by agents or systems in the facility, and/or estimated as described herein). In one embodiment, the container recommendation service may base its decision on item dimensions gathered through an automated dimensioning process (e.g., one employing a CubiScan® system), and may have a fairly high level of accuracy. In other embodiments, the item dimensions used in recommending a container may be estimated based on information received from a manufacturer or supplier of the items, or based on a process of successive approximation as the items are handled within the facility. In many cases, knowing the exact dimensions of an item may not be necessary for selecting a standard container or custom container dimensions into which a group of items can be placed, because the "practical" or estimated dimensions of the items may provide a size range accurate enough to select a standard container from among a finite set of container or form a custom container within a percentage of dimension tolerance to ensure that the item or group of items will fit.

In some embodiments, the container recommendation service may make particular assumptions about item dimensions or may assign item dimensions according to a standard algorithm, or company policy, in order to facilitate the recommendation of containers for item packages. For example, in one embodiment, the item dimension having the largest value may be designated to be the "length," the dimension having the second largest value may be designated to be the "height," and the dimension having the smallest value may be designated to be the "width" of the item. In such embodiments, the dimensions of containers may also be designated using the same assumptions. In other embodiments, different assumptions or assignments may be made or the designation of length, height, and width dimensions of items or containers may be arbitrary. In some embodiments, standards or policies may specify other aspects of the operations of the materials handling facility, such as a default placement or orientation for certain items within containers or a specific bin-packing algorithm to be assumed when recommending containers and/or estimating the cube utilization of an item or group of items if placed in a particular candidate container. For example, various policies may specify that the largest (and/or heaviest) item in a group should be placed horizontally along the bottom of the container and smaller items placed on top of the larger items.

As noted above, known and/or estimated item dimension values may be used to identify standard containers 401 whose volume and/or dimensions are appropriate for handling the item package 409. In addition, in some embodiments, the dimension values and/or volume of the packaging materials and any other non-item contents may also be considered when recommending a standard container 401 for the item package 409 or a custom container 411 for the item package 409. For example, the item package 409 dimensions and promotional inserts, fill material dimensions and/or gift wrapping may be supplied to the container recommendation service as an input and may be used in determining the appropriate standard container and custom container dimension values for collectively handling the item package and non-item contents.

In one embodiment, the volume of an item package 409 may be defined to be equal to the volume of a three-dimensional bounding box having length, width, and height equal to the length, width, and height of the items contained in the item package when arranged for packing, and the volume of a container may be defined to be the maximum volume of the interior of the container. In some embodiments, the volume and dimensions of a group of items may be defined, respectively, to be the volume and corresponding dimensions of a three-dimensional bounding box having sufficient length, width, and height to contain all of the items in the item package. For example, in FIG. 4A, a container recommendation may be determined using a particular packing algorithm that calculates the volume of a bounding box surrounding the items 403, 405. This may be done according to guidelines and conventions for packing one or more items (e.g., the packing algorithm may specify that the largest and/or heaviest item should be placed horizontally on bottom of the container first and additional items may be placed on top of, or next to, this item in order of their largest dimension value, their weight, etc.). In another embodiment, the system may be configured to calculate a volumetric utilization (e.g., the percentage of the container that would be filled by the item(s) and any non-item contents) for the item(s) when placed in containers of various sizes and shapes.

Based on the calculated volumetric utilization of the item package, the system may then recommend a standard container 401 that is available within the fulfillment center that will maximize the volumetric utilization and recommend custom container dimension values for use in forming a custom container 411 (FIG. 4B) that maximizes volumetric utilization. In FIG. 4B, the custom container 411 has dimensions that are large enough to ship the item package 409. In one example, the dimensions of the custom container 411 may be slightly larger than the calculated dimensions of the item package 409 to ensure that the agent packing the custom container 411 with the items 403, 405 has sufficient room for the items 403, 405 or to account for item dimensions that may not be precise. While the examples contained herein use the definitions described above, other embodiments may use other definitions of volume and/or volumetric utilization, or may not use a determination of volume or volumetric utilization as part of a container recommendation process.

Figure 5:
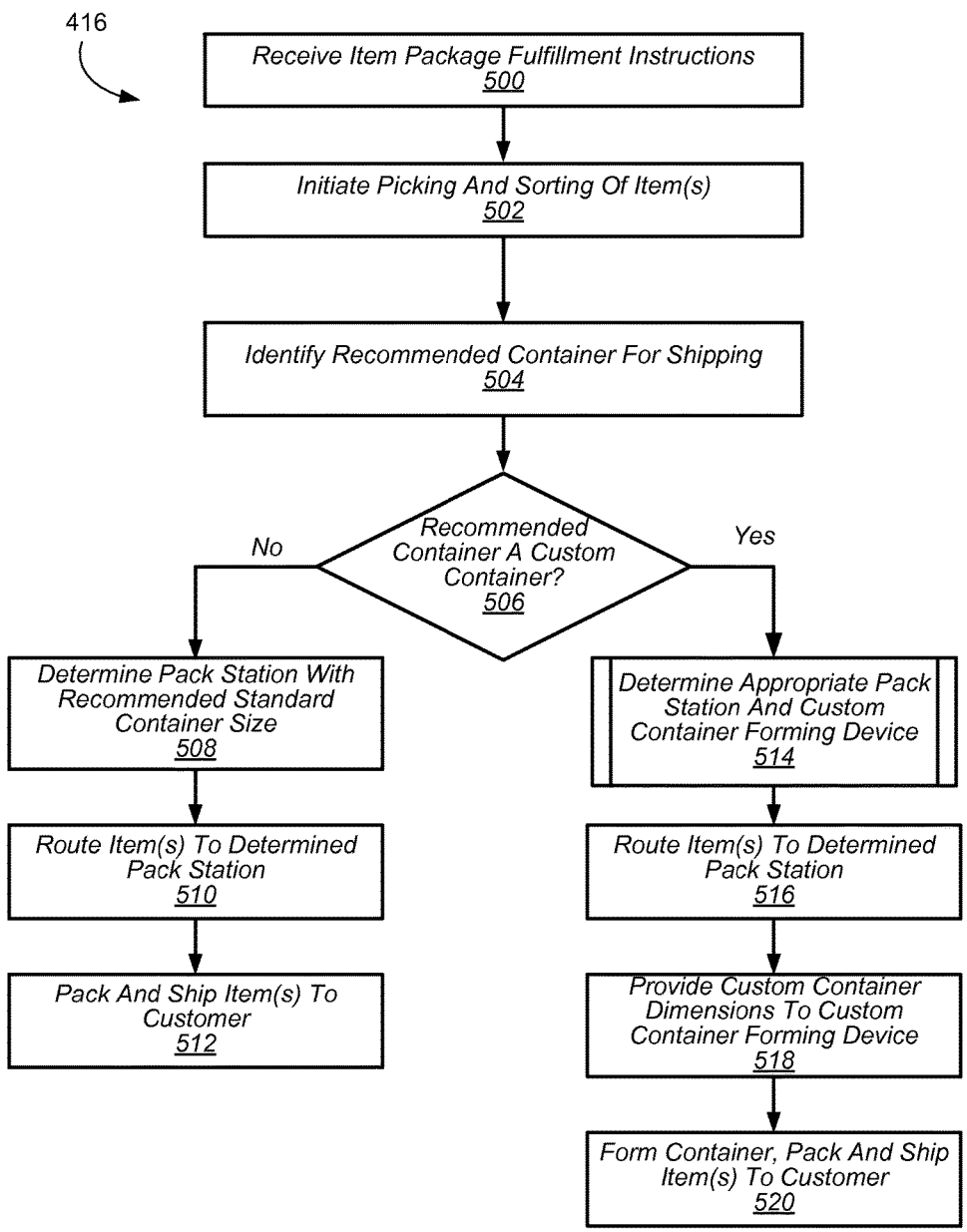
FIG. 5 is a flow diagram illustrating an example process for picking, sorting, packing and shipping an item package.

FIG. 5 is a flow diagram illustrating one embodiment of a process for picking, sorting, packing and shipping an item. As illustrated in the example in FIG. 5, the process may include receiving item package fulfillment instructions for use in fulfilling the customer's order, as in 500. Upon receiving an item package fulfillment instruction, picking, packing and sorting of items identified in the item package fulfillment instruction is initiated, as in 502. This may include generating a picking request that is completed by one or more picking agents for retrieving the item(s) included in the item package from the inventory of the fulfillment center and routing those items to a packing station. As discussed below, picking request may include requests to pick items for multiple orders that will be routed to the same pack station. In some implementations, orders allocated to the same pack station and/or custom container forming device may have similar item package dimensions such that custom containers for those item packages will be in the same size range (small, medium, large).

In addition to initiating the picking and sorting of items of the item package for shipment, the recommended container for shipping is identified, as in 504. The recommended container may be identified in the item package fulfillment instructions. Alternatively, a request may be submitted to the container recommendation service of the fulfillment center to obtain an identification of the recommended container. In such an example, the container recommendation service may maintain an identification of the container (standard or custom) for that item package.

Once the recommended container for the item package is identified, it is determined whether the recommended container is a custom container or a standard container, as in 506. If it is determined that the recommended container is a custom container, as illustrated by the positive exit from 506, a packing station with a custom container forming device capable of forming the recommended custom container is determined, as in 514. In an alternative embodiment, if there is no available pack station with a custom container forming device capable of forming the custom container, or if the custom container forming devices are located in another area of the materials handling facility, an available packing station is determined and a custom container forming device capable of forming the recommended custom container is determined.

As discussed further below with respect to FIG. 6, even though the custom container forming devices may be capable of forming containers of numerous dimensions, the range of dimensions with which a particular custom container forming device may form containers may be restricted. For example, the packaging information system may restrict a particular custom container forming device to only form small containers from a single blank of corrugate, such as a 22 inch wide corrugate blank. Likewise, another custom container forming device may be restricted to only forming medium sized containers from a larger blank of corrugate (e.g., 26 inch wide corrugate blank) and a third custom container forming device may be restricted to only forming large custom containers from yet another, larger blank of corrugate (e.g. a 36 inch wide corrugate blank). By restricting the dimensions with which custom container forming devices are allowed to form custom containers, the downtime required to reposition components of the device is reduced, thereby increasing the throughput of the packing stations.

Upon identifying the appropriate packing station and/or custom container forming device for the custom container, the items are routed to the determined packing station, as in 516. This may include routing the picking of items to particular bins or sorting stations within the fulfillment center or routing the sorting of those items to particular packing stations. In addition to routing items to the identified packing station, the custom container dimension values for use in forming a custom container are provided to a custom container forming device. This may be a custom container forming device located at the identified packing station or a custom container forming device that not located at the identified packing station, as in 518. In an alternative implementation, items of the item package may be scanned, using for an example a CubiScan® system to determine actual dimension values and compute custom container dimension values that are provided to the custom container forming device. The custom container forming device, upon receiving custom container dimensions, may then form the custom container. In examples where the custom container forming device is located at the identified packing station, the custom container may be formed once the items arrive at the packing station. In examples where the custom container forming device is not part of the packing station, the custom container may be formed, associated with the item package and routed to the identified packing station. The formed custom container may be associated with the item package in a variety of ways. For example, an identifier may be attached or added to the custom container such that when the custom container reaches the packing station it can be identified as associated with the item package. The identifier may be, for example, a bar code, label, sticker, and the like. Once the item(s) for the item package and the custom container are located at the packing station, one or more packers at the packing station may pack the items into the custom container, as in 520.

If however, it is determined that the recommended container is not a custom container, as illustrated by the negative exit from 506, the appropriate packing station with the recommended standard container size is identified, as in 508, and the items of the item package are routed to the determined packing station, as in 510. Once all of the items have arrived at the determined packing station, one or more agents at the packing station may pack the items in the standard container for shipping to the customer, as in 512.

Figure 6:
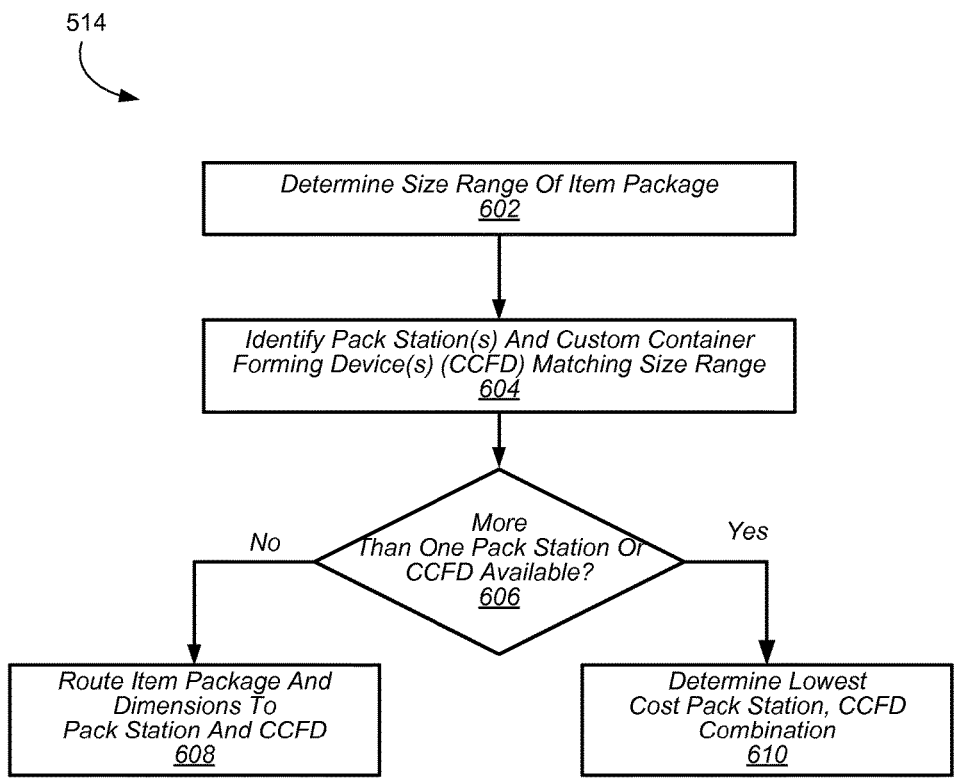
FIG. 6 is a flow diagram illustrating an example process for determining an appropriate pack station for a custom container.

FIG. 6 is a flow diagram illustrating an example process for determining an appropriate pack station for a custom container, as in 514 (FIG. 5). Upon determining that an item package is to be packed in a custom container, the size range of the custom container is determined, as in 602. Size ranges may be specified based on custom container forming device restrictions assigned to various custom container forming devices. There may be three different size ranges (small, medium, large) for which custom containers may be assigned. For example, any custom container with a width× height total less than 22 inches, may be classified in a small custom container size range, any custom container with a width×height total between 22 inches and 26 inches may be classified in the medium custom container range, and any custom container with a width×height total above 26 inches may be classified as a large custom container range. In a similar fashion, custom container forming devices may be restricted to only forming custom containers in one of the size ranges. In some implementations, the length of the custom containers may not be considered as each of the custom container forming devices can form a custom container having any length. Alternatively, custom container forming device may alter size ranges depending on what corrugate blank is currently available or in use. For example, if a custom container forming device is currently forming small custom containers using a corrugate blank having a width of 22 inches and uses the entire corrugate blank, it may change to a second width corrugate blank and begin forming custom containers in a medium size range, or large size range. It will be appreciated that more, fewer, different and/or overlapping size ranges may be used with implementations described herein. In other example, different factors may be considered when restricting custom container forming devices. For example, custom container forming devices may be configured to form non-uniform or odd shaped custom containers—such as custom containers with more or fewer than six sides. In such an example, factors in addition to or than width×height may be considered.

By restricting custom container forming devices to a specific range such that they do not have to alternate between different corrugate blanks between forming of custom containers, the time required to form each custom container is reduced. In addition, by routing formation of custom containers for item packages of a particular size range associated with a corrugate blank to custom container forming devices utilizing that corrugate blank reduces the amount of wasted or scrap corrugate that results from forming custom containers.

In yet another example, rather than limiting custom container forming devices to a specific custom container range, thereby restricting it to a specific corrugate blank, forming of custom containers for item packages may be routed such that a batch of custom containers for item packages all having the same custom container size range (e.g., small, medium, large) are routed to one custom container forming device. A batch may be two or more custom containers. In yet another implementation, an agent at the pack station with a custom container forming device may manually place item packages from a batch of item packages into the packing process based on the dimension of the items for the item packages. For example, the agent may manually place all large item packages from a batch of item packages into the packing process, then place all medium item packages, then place all the small item packages. Routing batches of item packages having the same custom container size range to the same custom container forming device, provides the ability for the custom container to form multiple custom containers of the same size range without having to take time to change corrugate blanks and/or move the cutting blades to different corrugate blanks. Likewise, manually organizing item packages from a batch of item packages based on size reduces the time required for a custom container forming device to change between different corrugate blanks and/or move the cutting blades to different corrugate blanks.

Once the size range of the custom container has been determined, available pack stations and custom container forming devices that are currently configured to form custom containers of the determined size range are identified, as in 604. The custom container forming devices may be located at pack stations or anywhere in the materials handling facility. If there is more than one available pack station or custom container forming device capable of forming a custom container of the determined size range, as illustrated by positive exit at 606, a lowest cost pack station and custom container forming device combination is determined, as in 610. A lowest cost pack station, custom container forming device combination may be determined based on a variety of factors. For example, the location of the item(s) in the item package with respect to the various pack stations may be determined, the location of the available custom container forming devices with respect to the various pack stations determined, and a labor cost associated with routing the items and a formed custom container to the various pack stations determined. In another example, the current load experienced by the available pack stations and/or custom container forming devices may be assigned a cost, and those with a higher load assigned a higher cost. Additional or fewer costs may be applied in determining a lowest cost pack station, custom container forming device combination.

In contrast, if there is only one pack station and one available custom container forming device, the item package and custom container dimensions are routed to that pack station and that custom container forming device, as in 608. Once a pack station and custom container forming device have been determined, as in 608 or 610, the process continues as discussed above with respect to FIG. 5 in 516-520.

Figure 7:
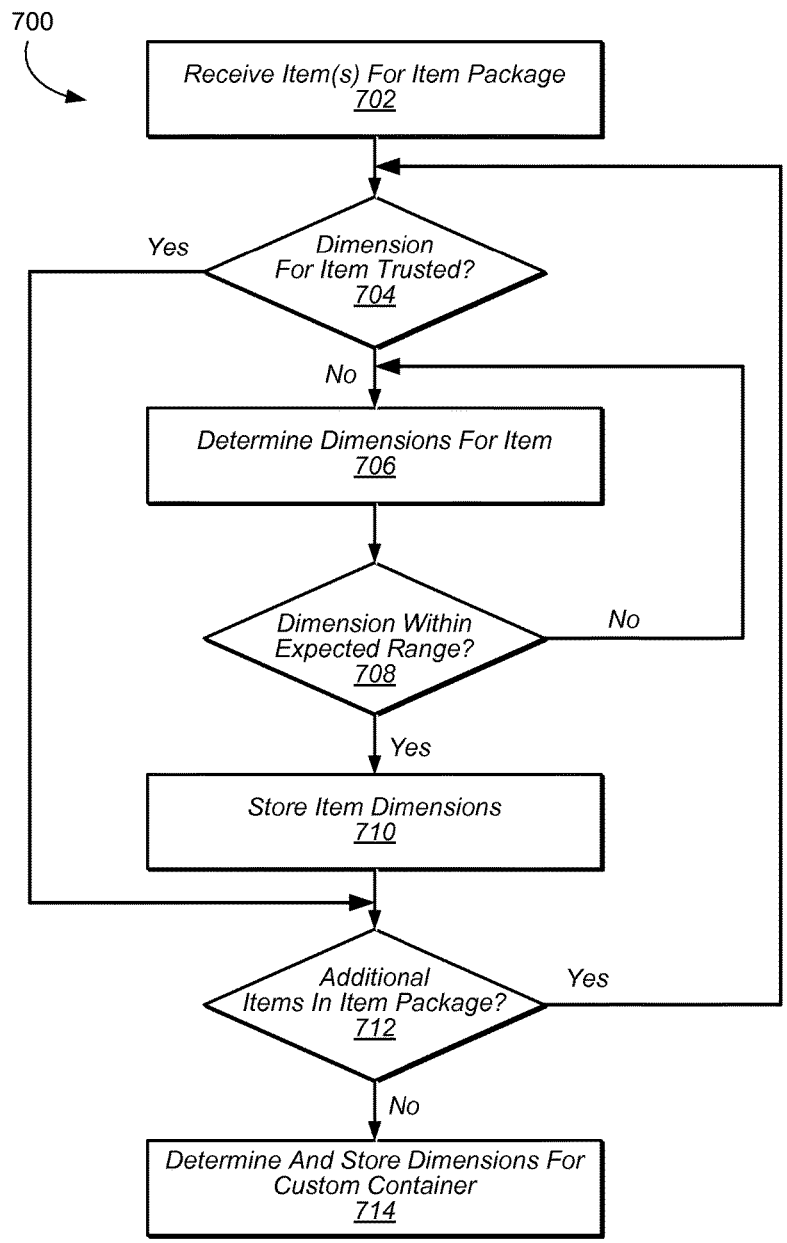
FIG. 7 is a flow diagram illustrating an example process for determining dimensions of an item package.

FIG. 7 is a flow diagram illustrating an example process for determining dimensions of an item package. In this example, the process may include receiving an indication of an item package for which container recommendations are requested, as in 702. Once the item package identifying the item or items to be handled are known, any estimated or known values of the dimensions (and/or volumes) of the item(s) or item package may be retrieved and a determination made as to whether those values are believed accurate (i.e., trusted), as in 704. In some embodiments, estimated or known dimensions and/or volumes of various items of the item package may be retrieved from a table or database, such as Table 1, described below. The item dimensions may be estimated based on information received from a manufacturer or vendor of the items, based on a process of successive approximation as the items are handled within the facility, based on measurements taken of the item while in the facility, and the like.

If it is determined that the item dimensions are not known and/or trusted, they are obtained, as in 706. For example, item dimensions may be obtained through an automated dimensioning process (e.g., one employing a CubiScan® system), manually measured, or otherwise approximated. Once the dimensions are obtained, it is determined whether the obtained dimensions are within an expected range for the item, as in 708. For example, if an automated dimensioning process returns values that deviate too far beyond known dimension values it may be determined that the obtained values are not within an expected range. While the automated dimensioning processes are generally quite accurate, if extraneous material, such as a label or tag, of an item is protruding from the item, the automated dimensioning machine may estimate dimensions for the item that bound around the exterior of the extraneous material, thereby expanding the overall dimensions.

If it is determined that the obtained dimensions are not within an expected range, the process may repeat and again obtain the dimension values, as illustrated by negative exit from 708. This may be performed using the same dimensioning process or by having an agent manually measure or otherwise estimate the dimension values for the item. If however, the obtained dimension values are within the expected range, as illustrated by positive exit from 708, the obtained item dimensions are stored in the system, as in 710. This may be done by replacing known item dimension values, including the obtained dimension values into an aggregate average of known and previously obtained dimension values, and the like.

Once the dimension values for an item of the item package are known, either through obtaining the values as in 706, or having known and trusted dimension values, it is determined whether additional items are included in the item package, as in 712. If there are additional items in the item package, as illustrated by positive exit from 712, the process returns to 704 and repeats for each additional item that makes up the item package. If however, there are no additional items for the item package, as illustrated by negative exit from 712, dimensions for the custom container are determined and stored, as in 714, such that the custom container when formed will be capable of containing all of the items of the item package. In some implementations, the overall dimensions of the item package, as well as dimensions of any required non-item content (if any), may be determined. In such cases, custom container dimensions that match the overall dimensions of the item(s) as well as dimensions of any required non-item contents may be determined. Alternatively, custom container dimension values that are a percentage (e.g., 2%) or size (e.g., 0.25 inches) larger in one or more dimensions than the overall dimensions of the item package and any non-item content may be determined. In other embodiments, a packing algorithm may be used to determine the appropriate dimensions for the custom container. In other embodiments, the determination of custom container dimension values may be performed in other manners.

Figure 8:
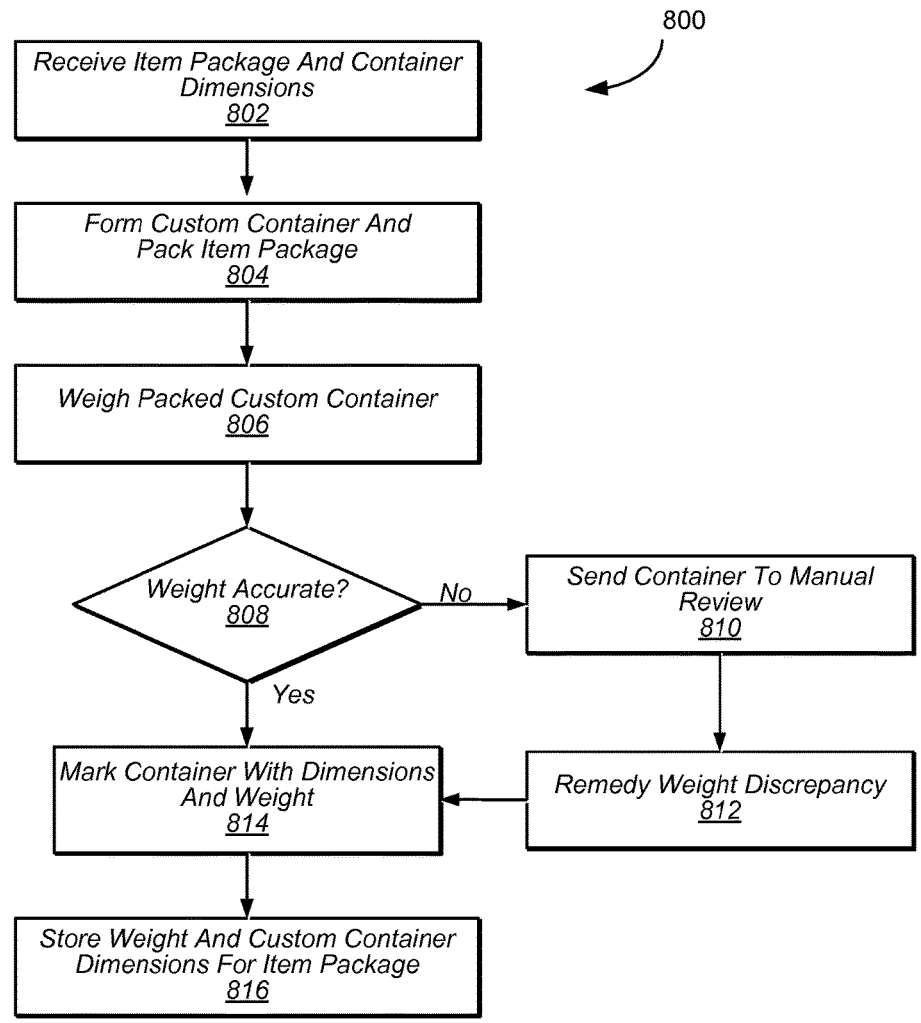
FIG. 8 is a flow diagram illustrating an example process for packing a custom container.

FIG. 8 is a flow diagram illustrating an example process for forming and packing a custom container. As discussed above, custom container dimension values are provided to a custom container forming device, as in 802, the custom container formed and the items of the item package put into the custom container for shipping, storing or other operations, as in 804. Once the custom container is packed with the item package and any non-item content (e.g., dunnage, advertisements), the custom container may be weighed, as in 806. Actual weight of a custom container may be used to determine the shipping costs for the container, the weight of the corrugate, whether the appropriate items are contained in the custom container, etc. For example, the actual weight may be compared to an estimated weight for the custom container to assess whether the custom container includes the appropriate items for the item package, as in 808. The estimated weight for the custom container may be based on, for example, the estimated or known weight for each item of the item package, the density and calculated weight of the corrugate, and the weight of any non-item content. Alternatively, the actual weight may be compared to the actual weight of the same item package previously packaged and shipped in either a custom container or a standard container. In an alternative example, the weight of the corrugate used may be estimated based on the known weight for each items of the item package and the weight of any non-item contents. The estimated weight of the corrugate may be stored by the system and then used to estimate transportation costs and confirm weight of other custom containers formed from the same density corrugate blank.

If it is determined that the weight is not accurate, as illustrated by negative exit from 808, the packed custom container may be removed from the shipping or storing process and manually reviewed, as in 810. Manual review may include inspection of the packed custom container to verify that the correct items are included in the custom container. If an item is missing, or too many items included, the weight discrepancy may be remedied by either adding or remove the missing/extra item(s) and returning the packed custom container to the shipping process, as in 812. In another example, rather than correcting the error, the items may be returned to inventory and the process of picking, packing and sorting for the item package may be restarted.

If the correct items are included in the custom container, the manual review may include determining why the weight did not match the expected weight, or weight range. For example, an agent may determine that the recorded weight for an item does not match the actual weight. This may occur, for example, when the vendor packaging for an item changes but a new weight value is not updated in the package planning system. In such an example, the agent may correct or otherwise update the recorded weight to correspond to the actual weight. If it is determined that the packed custom container does include the correct items for the item package it may be returned to the shipping or storing process.

If it is determined that the actual weight of the packed custom container is accurate, as illustrated by positive exit from 808, or after correction of a weight discrepancy, as in 812, the packed custom container may be marked with the actual custom container dimension values and the actual weight of the packed custom container, as in 814. Weight and dimension values may be included in a bar code, QR code or other form of indicia and applied to the custom container in the form of a sticker, etched onto the custom container directly, printed onto the custom container, or via any other means of associating the actual weight and dimension values with the packed custom container. In an alternative implementation, the actual weight and dimension values may be included directly on the custom container, rather than through use of a bar code or other identifier. In still another implementation, the custom containers may be identified using pre-formed labels or other identifiers, scanned during packing and the information (weight, dimensions etc.) stored in a database and associated with the custom container based on the affixed bar code or other identifier.

In addition to applying the actual weight and dimension values for the packed custom container to the custom container, or otherwise identifying/associating the weigh and dimensions with the custom container, the information may be recorded by the packaging information system. For example, the actual weight, the actual dimensions, corrugate information (e.g., weight), and non-item content included in the custom container may all be associated with the item package and recorded. The recorded information may then be utilized for future orders of the item package to determine, for example, the custom container dimension values, estimated weight, and shipping costs. In such an example, the box recommendation service may not need to be called for a subsequent order of the item package as the custom container dimension values are known.

While the above discussion has focused primarily on forming custom containers based on the overall dimensions of an item package and any non-item content, additional factors may be considered when forming a custom container for shipping, storage, or other types of handling. For example, if multiple items of slightly varying dimension values are to be placed in custom containers for storage, rather than forming each custom container based on the dimension values of each item—and thus each custom container having slightly varying dimensions, the dimension values for the custom containers may be normalized to one, or a smaller set of dimension values for packaging the various items for storage. Normalizing one or more of the dimension values for the custom containers will result in a more uniform storage of the items when packed in the custom containers.

Figure 9:
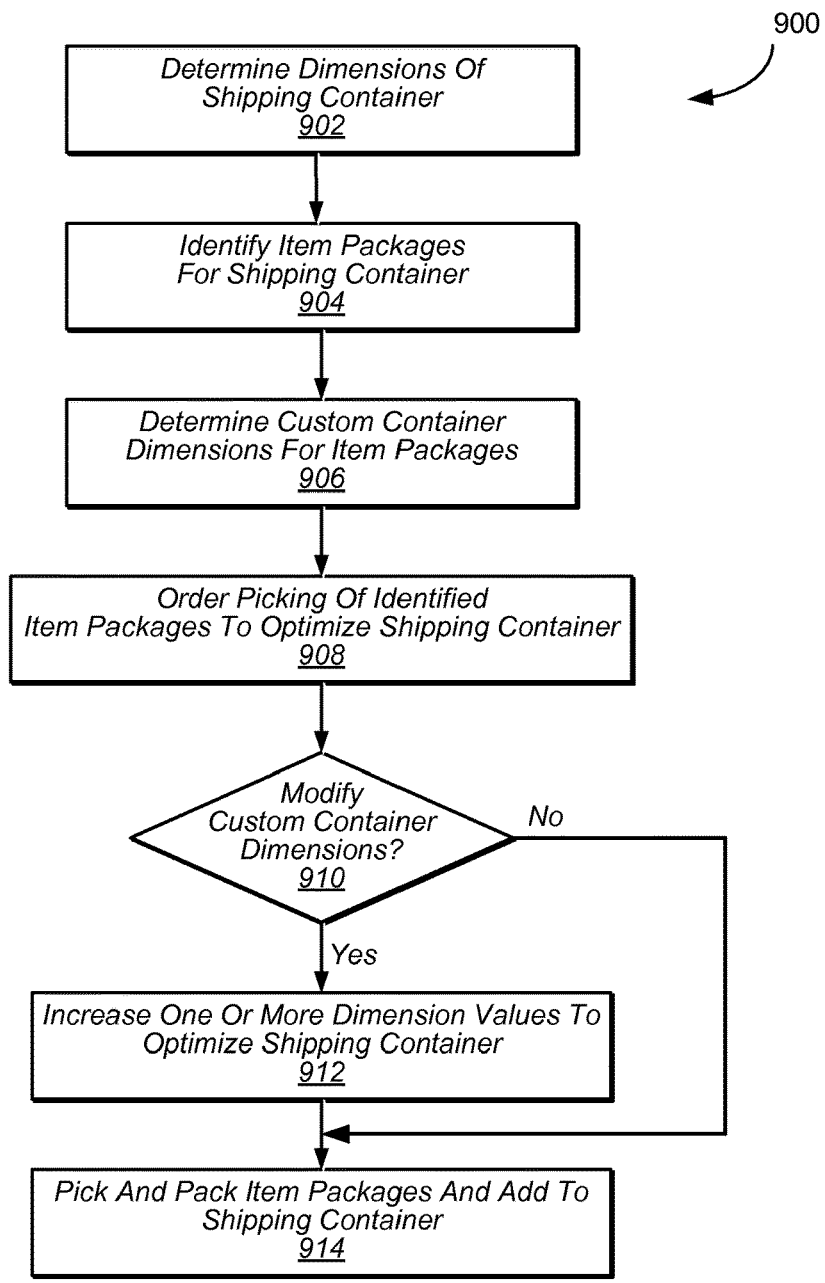
FIG. 9 is a flow diagram illustrating an example process for forming custom containers based on available shipping container dimensions.

FIG. 9 is a flow diagram illustrating another example process for forming custom containers based on additional information beyond the item package dimension values. In this example, the overall dimensions of a shipping container are also considered when forming custom containers. A shipping container may be any form of container used in shipping or storing items. For example, a shipping container may be a pallet, larger bin, trailer, etc. Regardless of the shipping container utilized, the dimension values for the shipping container are determined, as in 902. For bounded containers, such as trailers, this may be the overall dimension values, or the remaining space available within the shipping container. If the shipping container is not bounded, such as a pallet, the dimension values may be the length, width and height for which containers may be included or stacked on shipping container.

In addition to determining the dimension values for the shipping container, the item packages that are to be shipped in the shipping container are identified, as in 904. This may be item packages that are at a packing station, item packages for which items have not yet been picked from inventory, or item packages at any other point in the shipping or storing process that are assigned to the determined shipping container.

For each item package, the custom container dimension values are determined, as in 906. The system may then coordinate the picking, sorting, packing and routing of the item packages to optimize the dimensions of the shipping container, as in 908. For example, the inventory management system may coordinate the picking, sorting, packing and routing operations such that the heaviest item packages or those with the largest dimensions arrive at the shipping container first. In an alternative implementation, the system may select a combination of item packages whose total dimensions match those of the length and width of the shipping container such that they arrive first for placement in the bottom or first level of the shipping container.

In addition to coordinating the picking, sorting, packing and routing of item packages, it is also determined whether any of the dimension values for the custom containers associated with those item packages should be modified to further optimize the shipping container, as in 910. If it is determined that dimension values of one or more custom containers should be adjusted, as illustrated by positive exit from 910, the one or more dimension values for one or more custom containers may be increased, as in 912. For example, if the heaviest item packages are coordinated to arrive at the shipping container first, so they are placed on the bottom of the shipping container, so as not to damage other item packages, it may be determined that the dimensions of the associated custom containers should be adjusted so that the overall dimensions cover the length and width of the shipping container. Modifying the custom container dimensions for one or more custom containers such that when they are placed in the shipping container they collectively cover the length and width of the shipping container provides a better base upon which the next layer of custom containers may be placed into the shipping container. Likewise, the height of each of the identified custom containers may be normalized such that when all are placed in the shipping container the height is uniform, thereby providing a stable base upon which to stack additional custom containers. In addition, or as an alternative, an empty custom container (or standard container) may be formed to fill any void or remaining space in the configuration.

Once the dimension values of one or more custom containers has been increased, or if it is determined that custom container dimension values should not be modified, as illustrated by negative exit from 910, the items of the item packages are picked, sorted, packed in custom containers and stored in the shipping container, as in 914.

While the example provided with respect to FIG. 9 refers to custom containers, one or more standard containers may also be included in the process. In such an implementation, the dimension values of the standard containers may be fixed and it may be determined whether dimension values of custom containers should be increased or normalized to optimize the use of the shipping container, without modifying the dimension values of the standard container(s).

While several of the example embodiments illustrated herein are described in terms of a group of items, the techniques described herein may be applied by the system to recommend a container (standard or custom) suitable for shipping, storing or otherwise handling a single item, in other implementations.

A packaging information system may be further described using the following example. In this example, an e-commerce organization sells items of various types that can be shipped to customers or otherwise stored. Five example items are shown in an item parameter data store, in Table 1, below. In this example, the entry for each item includes a corresponding unique identifier, name, and type in columns 1-3. The item parameter data store also includes columns for storing values for various physical parameters of each item (columns 4-6), which in this example includes the item height, length, and width.

TABLE 1

| item ID | item name | item type | item height (in) | item length (in) | item width (in) |
| --- | --- | --- | --- | --- | --- |
| 4982 | book1 | book | 8.40 | 6.40 | 2.59 |
| 4325 | book2 | book | 8.29 | 6.40 | 2.59 |
| 2309 | plate38 | plate | 0.92 | 9.40 | 9.40 |
| 0873 | shoe17 | shoe | 14.00 | 8.00 | 6.54 |
| 1832 | DVD1 | DVD | 7.48 | 5.31 | 0.55 |

While not shown, in other embodiments, additional information may be stored in an item parameters data store, such as the volume or weight of the item, a confidence level for the item dimension values, information on statistical variances in the dimension values, whether the item has been designated to receive special damage protection, or other indications of allowable deviations from the dimension values. In some embodiments, a manufacturer, supplier or vendor may provide item dimensions for the items shown in Table 1. In other embodiments, the item dimension values may be values measured automatically or by agents in the facility, or may be values that have been estimated based on various containers in which the items have been handled. These dimension values may be used to recommend a standard container and/or recommend custom container dimension values for use in forming a custom container in which each item may be packaged, either alone or along with other items in an item package.

In some embodiments, dimension values and/or other parameter values for the standard containers may be stored in one or more tables, databases, or other data structures, such as the container parameters data store illustrated in Table 2 below. In this example, a standard container identifier, a standard container name, and a standard container type are stored in each entry of Table 2 in columns 1-3. Dimension values for various standard containers are shown in columns 4-6. In some embodiments, a manufacturer, supplier or vendor of a standard container may provide the values of various standard container parameters, including container dimensions. In other embodiments, standard container parameters may be determined by measuring one or more instances of the standard container.

In this example, the available standard containers include three types of boxes in which items may be shipped and two types of mailing envelopes in which items may be shipped (as shown in rows 4-5 of the data store).

TABLE 2

| container ID | container name | container type | height (inches) | length (inches) | width (inches) |
|---|---|---|---|---|---|
| 413 | smallbox1 | box | 19.0 | 13.0 | 11.75 |
| 293 | smallbox2 | box | 22.0 | 18.0 | 11.75 |
| 338 | bigbox1 | box | 24.00 | 16.00 | 16.00 |
| 557 | mailer1 | mailer | 0.25 | 5.00 | 5.00 |
| 806 | mailer2 | mailer | 0.40 | 9.00 | 12.00 |

In the example illustrated by Table 2, the values for the height, length, and width are shown for each standard container. In some embodiments, a manufacturer or supplier may provide the volume along with the dimensions, while in other embodiments, the packaging information system may calculate the volume from supplied or measured dimensions. In some embodiments, additional information regarding various standard containers (e.g., the weight or volume of the standard containers, a strength rating, or an indication of protective packaging materials or filler to be used in preparing items for shipment in the standard containers) may be maintained in a standard container parameters data store. In general, such a data store may include the values of more, fewer, or different parameters than those illustrated in Table 2.

In some embodiments, custom container dimension values and/or other parameter values for the custom container forming devices may be stored in one or more tables, databases, or other data structures, such as the container parameters data store illustrated in Table 3 below. In this example, a custom container forming device identifier and container size range that the device is configured to form are stored in each entry of Table 3 in columns 1-2. The corrugate blank widths used with the respective custom container forming devices are identified in column 3

In this example, the available custom container forming devices receive three different corrugate blanks and are configured to form three types size ranges of containers, small, medium and large (as shown in column 2 of the data store).

TABLE 3

| Device ID | Container size range | Corrugate blank width (inches) |
|---|---|---|
| 1485 | small | 20 |
| 1485 | medium | 28 |
| 1485 | large | 36 |
| 4329 | small | 10 |
| 4329 | medium | 20 |
| 4329 | large | 30 |

In some embodiments, additional information about various custom container forming devices (e.g., a strength rating of the corrugate used, speed of forming, different shapes of custom containers that can be formed, or an indication of protective packaging materials or filler to be used in preparing items for shipment in the custom containers) may be maintained in a custom container forming device parameters data store. In general, such a data store may include the values of more, fewer, or different parameters than those illustrated in Table 3.

In some embodiments, the packaging information system may store recommended and actual container dimensions (standard or custom) used for item packages in a table, database, or other data structure, such as Table 4 below, and may use this information to analyze various packaging related operations in the materials handling facility. In this example, Table 4 illustrates a package parameters data store, in which each entry (row) includes information about actual versus recommended containers for item packages used for shipping items to customers.

In this example, each entry includes a list of the container contents (e.g., the contents of an item package) along with the number of copies of each item included in the item package, and the identifiers of both the recommended container and the actual container used to package and ship the item package. For example, in Table 4, column 3 is used to store the name of the standard container recommended or the custom container dimension values recommended for a custom container. Column 4 is used to store the name of the actual standard container used to handle each item package or the dimensions actually used to form a custom container. In other embodiments, the dimensions of the standard containers may be used instead of the names. In this example, columns 5-6 may be used to store customer feedback for an item package shipment (e.g., customer ratings for damage and container size, respectively), and column 7 may be used to store agent feedback for the item package shipment (e.g., too small, too large).

In some embodiments, additional information may be stored in a package parameters data store, such as customer concessions, a date or timestamp for each entry or a batch number or other identifier of specific item or item group instances (not shown). In other embodiments, more, fewer or different parameters may be stored in a package parameters data store, or similar information may be stored in other combinations in one or more other tables, databases, or other data structures.

TABLE 4

| package ID | package contents | rec. cont. | actual cont. | damage rating | size rating | Agent feedback |
|---|---|---|---|---|---|---|
| 872093 | plate38 | smallbox2 | mailer2 | poor | fair | too big |
| 832189 | book1x3, book2x4, book3x7 | 7" × 6" × 4" | 7" × 6" × 4" | excellent | good | good |
| 098731 | book2x12, DVD1x2 | smallbox1 | smallbox2 | excellent | poor | too small |
| 631248 | book1x4 book2x8 shoe17x3 | 17" × 10" × 8" | 17" × 10" × 8" | excellent | good | good |

Various operations of a packaging information system, such as those described herein, may be executed on one or more computer systems, interacting with various other devices in a materials handling facility, according to various embodiments. One such computer system is illustrated by the block diagram in FIG. 10. In the illustrated embodiment, a computer system 1000 includes one or more processors 1010A, 1010B through 1010N, coupled to a non-transitory computer-readable storage medium 1020 via an input/output (I/O) interface 1030. The computer system 1000 further includes a network interface 1040 coupled to an I/O interface 1030, and one or more input/output devices 1050. In some embodiments, it is contemplated that a packaging information system may be implemented using a single instance of the computer system 1000, while in other embodiments, multiple such systems or multiple nodes making up the computer system 1000 may be configured to host different portions or instances of a packaging information system. For example, in one embodiment, some data sources or services (e.g., capturing actual container information) may be implemented via one or more nodes of the computer system 1000 that are distinct from those nodes implementing other data sources or services (e.g., recommending a container for an item package). In some embodiments, a given node may implement the functionality of more than one component of a packaging information system.

In various embodiments, the computer system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various embodiments the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various embodiments, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within the non-transitory computer-readable storage medium 1020 as program instructions 1025 and data storage 1035, respectively. In other embodiments, program instructions and/or data may be received, sent or stored upon different types of computer-accessible media, such as non-transitory media, or on similar media separate from the non-transitory computer-readable storage medium 1020 or the computer system 1000. Generally speaking, a non-transitory, computer-readable storage medium may include storage media or memory media such as magnetic or optical media, e.g., disk or CD/DVD-ROM coupled to the computer system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one embodiment, the I/O interface 1030 may be configured to coordinate I/O traffic between the processors 1010A-1010N, the non-transitory computer-readable storage medium 1020, and any peripheral devices in the device, including the network interface 1040 or other peripheral interfaces, such as input/output devices 1050. In some embodiments, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some embodiments, the I/O interface 1030 may include support for devices attached through various types of peripheral buses, such as a variant of the Peripheral Component Interconnect (PCI) bus standard or the Universal Serial Bus (USB) standard, for example. In some embodiments, the function of the I/O interface 1030 may be split into two or more separate components, such as a north bridge and a south bridge, for example. Also, in some embodiments, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the computer system 1000 and other devices attached to a network, such as other computer systems, or between nodes of the computer system 1000. In various embodiments, the network interface 1040 may support communication via wired or wireless general data networks, such as any suitable type of Ethernet network. For example, the network interface 1040 may support communication via telecommunications/telephony networks such as analog voice networks or digital fiber communications networks, via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in the computer system 1000 or may be distributed on various nodes of the computer system 1000. In some embodiments, similar input/output devices may be separate from the computer system 1000 and may interact with one or more nodes of the computer system 1000 through a wired or wireless connection, such as over the network interface 1040.

Figure 10:
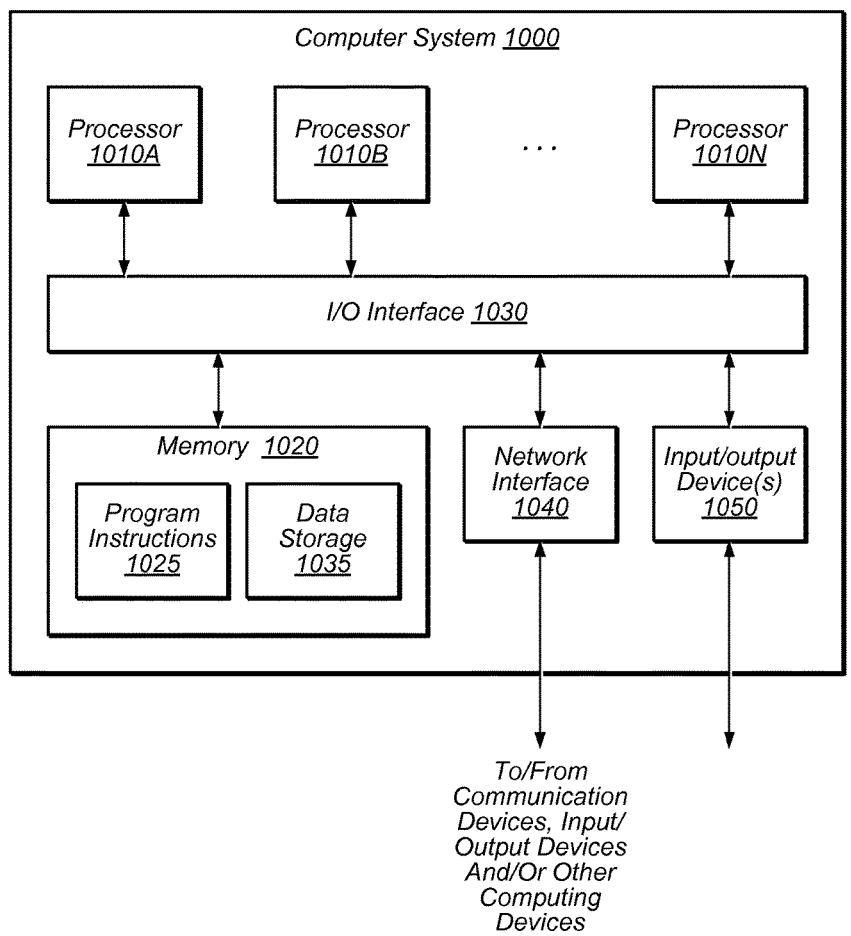
FIG. 10 is a block diagram illustrating an example computer system configured to implement one or more of the packaging related operations described herein.

As shown in FIG. 10, the memory 1020 may include program instructions 1025 which may be configured to implement a packaging information system and data storage 1035, which may comprise various tables, databases and/or other data structures accessible by the program instructions 1025. In one embodiment, the program instructions 1025 may include various software modules configured to implement a product dimension estimator, a product dimension correction system, a planning service, a container recommendation service (which may include or make use of a specialty packaging service), a transportation costing service, and/or a package performance analyzer. The data storage 1035 may include various data stores for maintaining one or more protected item lists, data representing physical characteristics of items and/or other item parameter values (such as those illustrated as being stored in Table 1), standard container parameter values (such as those illustrated as being stored in Table 2), custom container forming device parameter values (such as those illustrated as being stored in Table 3), item package information (such as those illustrated as being stored in Table 4), shipping reports (not shown), actual or expected shipping costs, avoidable shipping costs, package performance reports, etc. The data storage 1035 may also include one or more data stores for maintaining data representing delivery related feedback, such as customer ratings, experiences and the like.

In various embodiments, the parameter values and other data illustrated herein as being included in one or more data stores may be combined with other information not described or may be partitioned differently into more, fewer, or different data structures. In some embodiments, data stores used in a packaging information system, or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different embodiments. Similarly, in other embodiments, different software modules and data stores may make up a packaging information system and/or any of the various components thereof described herein.

Users may interact with the packaging information system (and/or various components thereof) in various ways in different embodiments, such as to automatically measure and/or manually specify measured dimension values for items and/or packaging, to specify and/or modify thresholds to be used when determining suspect item dimensions, or to specify package performance reports to be generated and/or report parameters. For example, some users may have physical access to the computing system 1000, and if so, may interact with various input/output devices 1050 to provide and/or receive information. Alternatively, other users may use client computing systems to access the packaging information system and/or its constituent components, such as remotely via the network interface 1040 (e.g., via the Internet and/or the World Wide Web). In addition, some or all of the packaging information system components may provide various feedback or other general types of information to users (e.g., in response to user requests) via one or more input/output devices 1050.

Those skilled in the art will appreciate that the computing system 1000 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. The computing system 1000 may also be connected to other devices that are not illustrated, or instead may operate as a stand-alone system. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other embodiments, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the techniques described herein may be practiced with other computer system configurations.

Those skilled in the art will appreciate that in some embodiments the functionality provided by the methods and systems discussed above may be provided in alternative ways, such as being split among more software modules or routines or consolidated into fewer modules or routines. Similarly, in some embodiments, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered. The various methods and systems as illustrated in the figures and described herein represent example embodiments. The methods and systems may be implemented in software, hardware, or a combination thereof in other embodiments. Similarly, the order of any method may be changed and various elements may be added, reordered, combined, omitted, modified, etc., in other embodiments.

From the foregoing, it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer-readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a custom container forming device within a materials handling facility, the custom container forming device operable to form custom containers based at least in part on received dimension values;
a computing system, including:
one or more processors; and
a memory storing program instructions that when executed by the one or more processors cause the one or more processors to at least:
determine that a plurality of like items are present at a receive station of the materials handling facility;
estimate a percentage of shipments to be shipped in custom containers formed by the custom container forming device in which each custom container will contain an item of the plurality of like items and a second item;
determine, based at least in part on the percentage, at least a portion of the plurality of like items to be allocated to an inventory location of the materials handling facility for storage;
determine, based at least in part on a first plurality of dimension values of the item and a second plurality of dimension values of the second item, a third plurality of dimension values for a custom container such that the item and the second item may be contained in a custom container formed in accordance with the third plurality of dimension values;
form, with the custom container forming device, the custom container in accordance with the third plurality of dimension values;
cause the item and the second item to be placed into the custom container such that the custom container, the item, and the second item form a single item for inventory handling;
initiate routing of the single item to an inventory location of the materials handling facility for storage;
subsequent to the single item being routed to the inventory location and stored at the inventory location:
receive an order for the item and the second item; and
initiate a pick of the single item from the inventory location and a routing of the single item from the inventory location to a shipping station of the materials handling facility for shipment of the single item to fulfill the order.

2. The system of claim 1, wherein the program instructions when executed by the one or more processors further cause the one or more processors to at least:
prior to the order being received, associate, in a data store, the third plurality of dimension values with the item and the second item.

3. The system of claim 1, wherein the inventory location is within a defined distance of the custom container forming device.

4. The system of claim 1, wherein:
the inventory location is segmented into a plurality of regions, each region associated with a size range; and
a region of the plurality of regions is configured to receive the single item based at least in part on the third plurality of dimension values.

5. The system of claim 1, wherein the program instructions when executed by the one or more processors further cause the one or more processors to at least:
determine that the percentage exceeds a threshold; and
wherein routing of the single item is initiated in response to the determination that the percentage exceeds the threshold.

6. The system of claim 5, wherein the threshold is determined based at least in part on at least one of: an amount of space available in the inventory location, a size of an item of the plurality of like items, a cost to move an item of the plurality of like items within the materials handling facility, or a frequency with which an item of the plurality of like items is ordered.

7. The system of claim 1, wherein the program instructions when executed by the one or more processors further cause the one or more processors to at least:
determine an amount of like items included in the materials handling facility; and
wherein the at least a portion of the plurality of like items is determined such that a sum of the at least a portion of the plurality of like items and a second amount of other like items at a standard inventory location corresponds to the amount of like items.

8. The system of claim 1, wherein the at least a portion of the plurality of like items is determined such that an amount of items in the at least a portion of the plurality of like items corresponds to the percentage.

9. A system, comprising:
a custom container forming device within a materials handling facility, the custom container forming device operable to form custom containers based at least in part on received dimension values;
a computing system, including:
one or more processors; and
a memory storing program instructions that when executed by the one or more processors cause the one or more processors to at least:
determine that a plurality of like items are present at a receive station of the materials handling facility;
estimate that a percentage of the plurality of like items will be placed in custom containers formed within the materials handling facility;
determine, based at least in part on the percentage, at least a portion of the plurality of like items to be allocated to an inventory location of the materials handling facility;
determine, based at least in part on a first dimension value of an item of the plurality of like items and a second dimension value of the second item, a third dimension value for a custom container such that the item and the second item may be contained in a custom container formed in accordance with at least the third dimension value;
form, with the custom container forming device, the custom container in accordance with at least the third dimension value;

cause the item and the second item to be placed into the custom container such that the custom container, the item, and the second item form a single item for inventory handling;

initiate routing of the single item to the inventory location of the materials handling facility for storage; and subsequent to the single item being automatically routed to the inventory location and stored:
   receive an order for the item and the second item; and
   route the single item to a shipping station of the materials handling facility for shipment of the single item to fulfill the order.

10. The system of claim 9, wherein the program instructions, that when executed by the one or more processors further cause the one or more processors to at least:

prior to receiving the order, associate, in a data store, the item and a dimension of the item with the second item and a dimension of the second item.

11. The system of claim 9, wherein the inventory location is within a defined distance of the custom container forming device.

12. The system of claim 9, wherein:

the inventory location is segmented into a plurality of regions, each region associated with a size range; and one of the plurality of regions is determined for each item of the portion of like items based at least in part on dimension values associated with each item.

13. The system of claim 12, wherein each of the plurality of regions is within a defined distance of at least one custom container forming device capable of forming custom containers having dimension values corresponding to the associated size range.

14. The system of claim 9, further comprising:

determine an amount of like items included in the materials handling facility; and wherein the at least a portion of the plurality of like items is determined such that a sum of the portion of the plurality of like items and a second amount of other like items at a standard inventory location corresponds to the amount of like items.

15. The system of claim 9, wherein the portion of the plurality of like items is determined such that an amount of like items in the portion of the plurality of like items corresponds to the percentage.

16. A system, comprising:

a custom container forming device within a materials handling facility, the custom container forming device operable to form custom containers based at least in part on received dimension values;

a product dimension estimator configured to scan an item and determine a plurality of dimension values of the item;

a computing system, including:

one or more processors; and a memory storing program instructions that when executed by the one or more processors cause the one or more processors to at least:

determine that a plurality of like items are present at a receive station of the materials handling facility;

estimate that a percentage of the plurality of like items will be placed in custom containers formed within the materials handling facility;

estimate a frequency in which an item of the plurality of like items will be shipped with a second item;

scan, with the product dimension estimator, an instance of the item to obtain a first plurality of dimension values for the item;

determine a second plurality of dimension values for a custom container such that the item and the second item may be contained therein, wherein the second plurality of dimension values are based at least in part on the first plurality of dimension values;

form, with the custom container forming device, the custom container in accordance with the second plurality of dimension values;

cause the item and the second item to be placed into the custom container such that the custom container, the item, and the second item form a single item for inventory handling;

initiate routing of the single item to an inventory location of the materials handling facility for storage;

subsequent to the single item being routed to the inventory location and stored at the inventory location;

receive an order for the item and the second item; and initiate a pick of the single item from the inventory location and a routing of the single item to a shipping station of the materials handling facility for shipment of the single item to fulfill the order.

* * * * *